United States Patent
Fukushima et al.

(10) Patent No.: US 8,183,476 B2
(45) Date of Patent: May 22, 2012

(54) POSITION DETECTION DEVICE AND POSITION INPUT DEVICE

(75) Inventors: Masamitsu Fukushima, Saitama-ken (JP); Toshihiko Horie, Saitama-ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 1783 days.

(21) Appl. No.: 11/410,294

(22) Filed: Apr. 25, 2006

(65) Prior Publication Data
US 2006/0267580 A1 Nov. 30, 2006

(30) Foreign Application Priority Data
Apr. 26, 2005 (JP) .................................. 2005-127612

(51) Int. Cl.
*G06F 3/046* (2006.01)
(52) U.S. Cl. ............... 178/18.07; 178/18.08; 178/19.03; 178/18.01; 178/18.03; 345/174
(58) Field of Classification Search ............... 178/18.07, 178/18.08, 19.03, 18.03, 18.02; 345/156, 345/173, 174
See application file for complete search history.

(56) References Cited

U.S. PATENT DOCUMENTS

| | | | | |
|---|---|---|---|---|
| 3,819,025 A * | 6/1974 | Fushida et al. | ................ | 400/155 |
| 5,218,173 A * | 6/1993 | Garwin et al. | ............. | 178/18.08 |
| 7,453,269 B2 * | 11/2008 | Won et al. | ..................... | 324/658 |
| 2002/0054012 A1 * | 5/2002 | Endo et al. | ..................... | 345/156 |
| 2003/0142073 A1 * | 7/2003 | Fukushima et al. | .......... | 345/158 |

FOREIGN PATENT DOCUMENTS

| | | |
|---|---|---|
| JP | 01-158522 | 6/1989 |
| JP | 06-019027 U | 3/1994 |
| JP | 06-309085 | 11/1994 |
| JP | 07-056675 | 3/1995 |
| JP | 10-049287 | 2/1998 |

* cited by examiner

*Primary Examiner* — Lun-Yi Lao
*Assistant Examiner* — Insa Sadio
(74) *Attorney, Agent, or Firm* — Berenato & White, LLC

(57) ABSTRACT

In a position detection device which detects a position indicated by a position indicator, improvements are made such that signals can be received precisely and reliably even at the end portions of the detectable region. In a tablet 20 which detects the position of an input pen 10 by means of electromagnetic inductive action with the input pen 10, a shield plate is positioned below a sensor substrate having a plurality of coils, and a shield layer of a ferromagnetic material is provided to overlap with the shield plate.

19 Claims, 25 Drawing Sheets

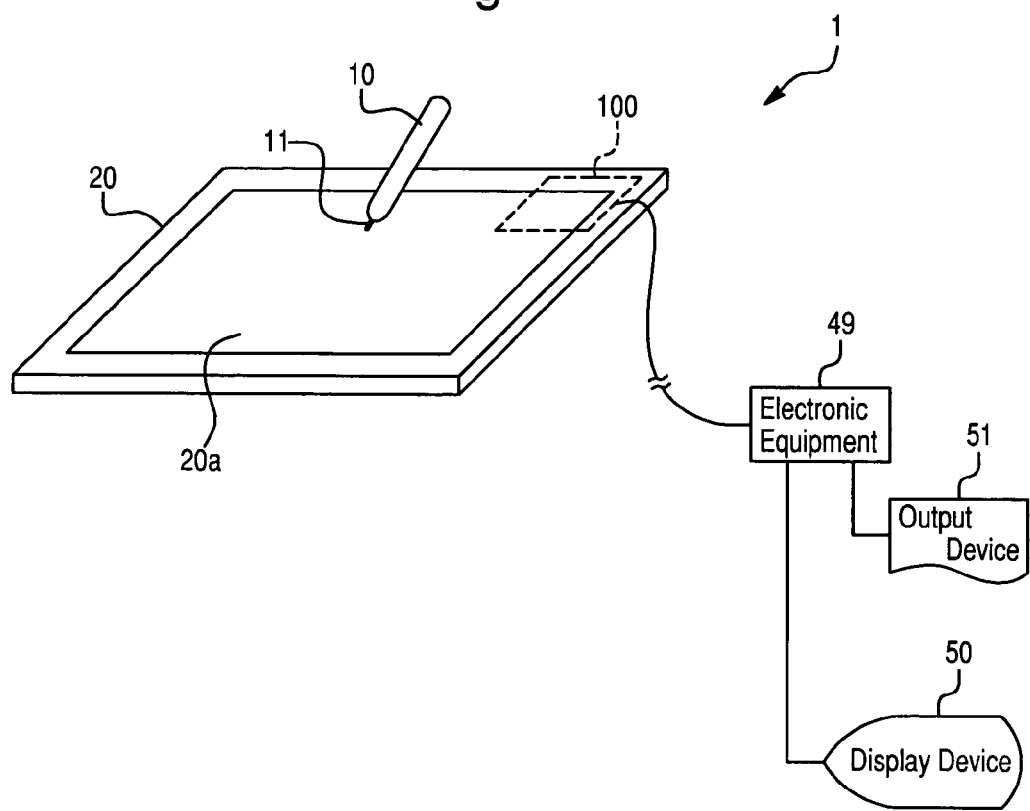

Fig. 3
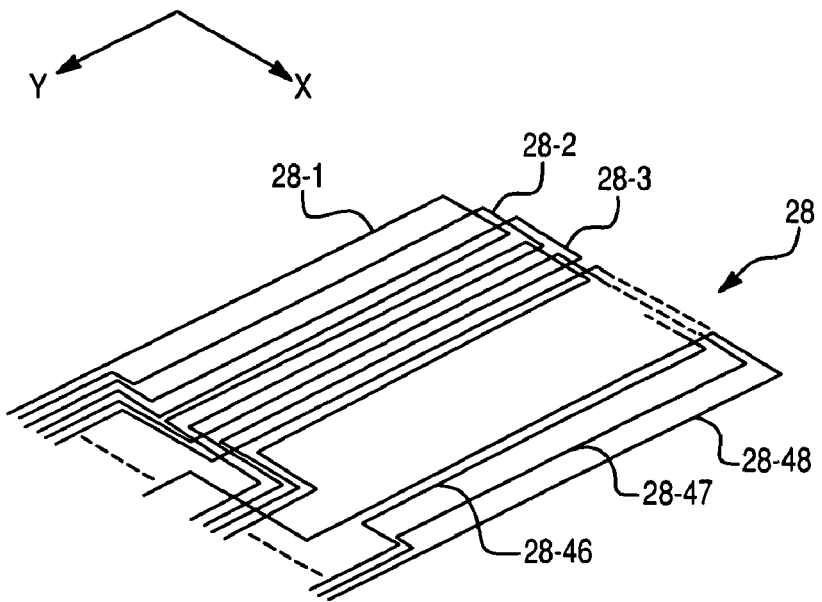
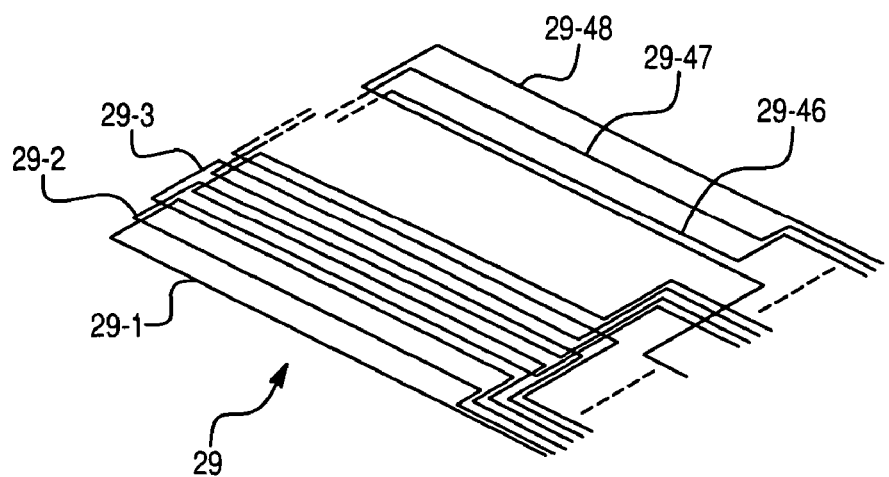

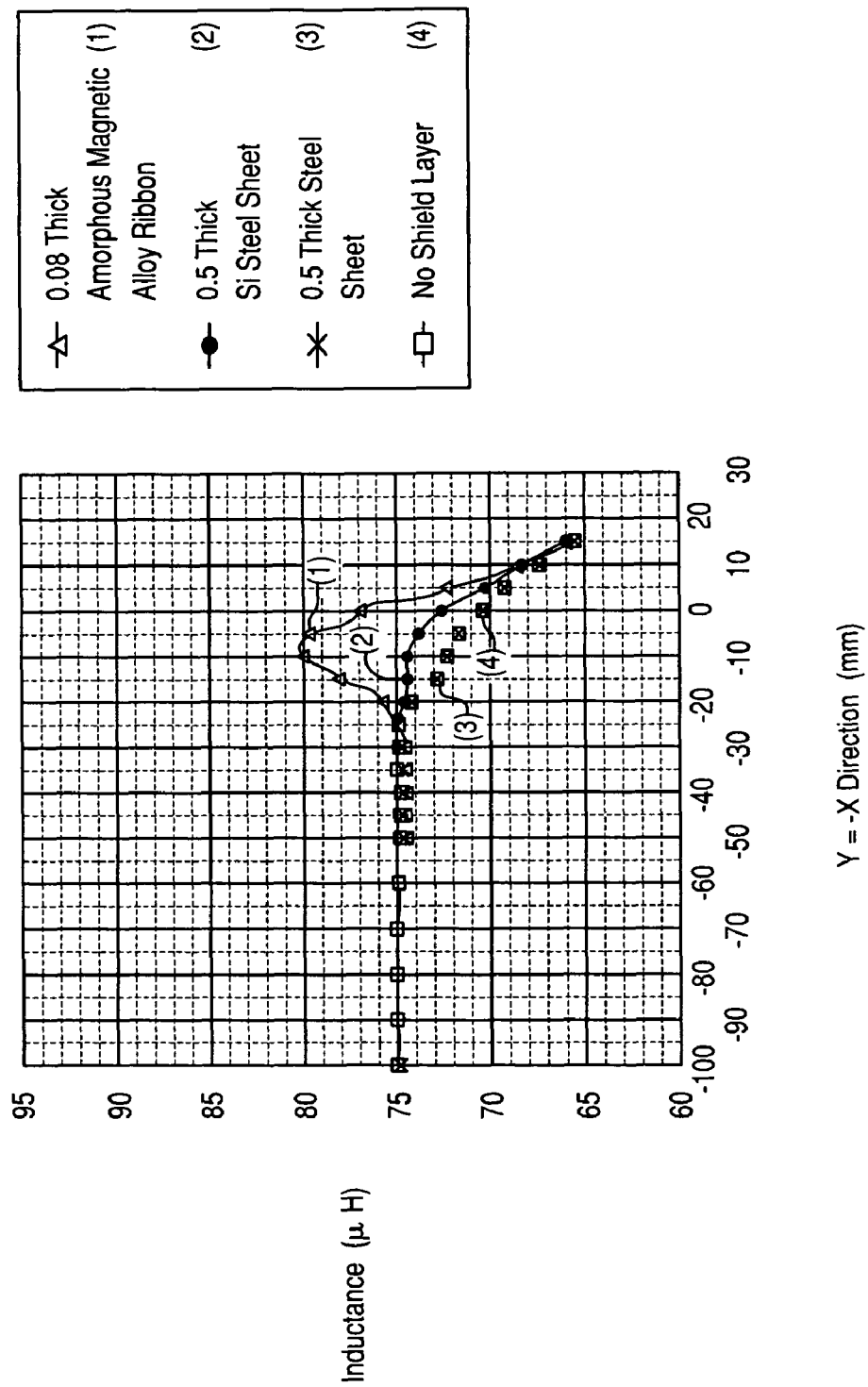

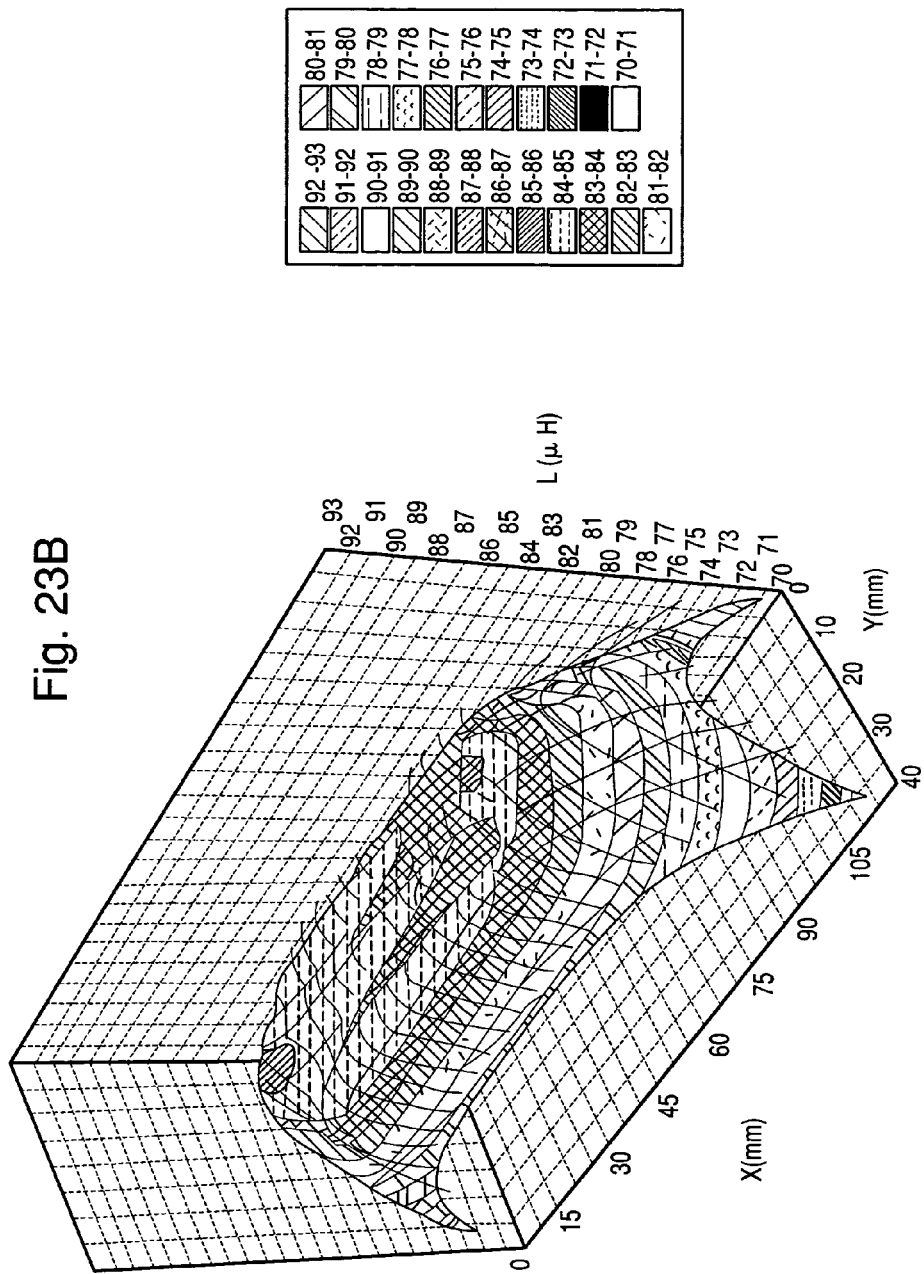

POSITION DETECTION DEVICE AND POSITION INPUT DEVICE

BACKGROUND OF THE INVENTION

1. Field of the Invention

This invention relates to a position detection device to detect a position indicated by a position indicator, and a position input device comprising this position detection device.

2. Background of the Invention

In the past, position input devices are known which are called pen tablets and comprise a pen-type position indicator and a substantially plate-shaped position detection device. This position input device utilizes the electromagnetic coupling between the position indicator and the position detection device to send and receive weak signals. In recent years, in order to improve the ease of use of position detection devices, there have been demands for more precise and reliable signal transmission and reception between the position indicator and the position detection device. A method has been proposed in which a shield plate is added to the sensor substrate of the position detection device to diminish the effects of noise so that reception accuracy is improved (see for example Japanese Patent Laid-open No. 1-158522).

Recently, expansion of the detectable region (the so-called effective area) of the position input device in which the position of the position indicator can be detected has been sought, in order to improve ease of use; on the other hand, smaller position detection devices are also being sought. In order to respond to these two contradictory demands, the fraction of the housing size occupied by the detectable region has become relatively large. However, as a result of the decrease in the space on the outside of the detectable region, limitations are imposed on design innovations, such as providing larger sensor substrates, or separating circuitry which can be a source of noise from the sensor substrate, and consequently there is the possibility that reception sensitivity may decline. Particularly at the edges of the detectable region, there has been the possibility of a prominent decline in reception sensitivity. As a result, in the past, methods based on software operation have been used to compensate for reduced sensitivity, in anticipation of declines in reception sensitivity.

An object of this invention is, in a position detection device which detects the position indicated by a position indicator, to enable precise and reliable signal reception, while achieving compact size.

SUMMARY OF THE INVENTION

In order to resolve the above problems, a position detection device of this invention, which detects the position indicated by a position indicator through electromagnetic inductive action with the position indicator, is characterized in that a shield plate is positioned below the sense portion having a plurality of coils, and a magnetic body comprising a ferromagnetic material other than pure iron is positioned to overlap at least a portion of the surface of the shield plate.

As used herein, "shield plate" refers to a plate-shaped member having either one or both of an electromagnetic shielding effect by means of which noise is attenuated or blocked from reaching the sense portion, and an effect of reducing scattering in the intensity of electromagnetic inductive action with the position indicator. No limitations are placed on the material or the size of the shield plate. Also, "pure iron" refers to iron of purity 99.9 weight percent or higher.

Also, in this invention, the magnetic body of ferromagnetic material may be such that, when a prescribed air-core coil is pressed thereagainst, the inductance, maximum relative permeability, or initial relative permeability of the air-core coil is equal to or greater than that of the material of the shield plate.

In this invention, the magnetic body may be formed by layering a plurality of layers of the ferromagnetic material.

In this invention, the ferromagnetic material may have an inductance of 75 µH (microhenries) or higher.

In this invention, the ferromagnetic material may have a maximum relative permeability (µm) of 7000 or higher.

In this invention, the ferromagnetic material may have an initial relative permeability (µi) of 1500 or higher.

In this invention, the ferromagnetic material may be any one of silicon steel, NiCr alloy, PB permalloy, 42-Ni alloy, an amorphous magnetic alloy which has not been heat-treated, PC permalloy, or a heat-treated amorphous magnetic alloy.

In this invention, the shield plate may be formed from silicon steel.

In this invention, the silicon steel may contain 4.0 to 7.0 weight percent silicon.

In this invention, the magnetic body may, on the surface of the shield plate, cover at least the end portions.

In this invention, the magnetic body may, on the surface of the shield plate, cover at least one or more corner portions.

In this invention, the magnetic body may, on the surface of the shield plate, cover the edge portions.

In this invention, the magnetic body may cover at least one entire face of the shield plate.

In this invention, the magnetic body may, below the shield plate, be positioned so as to extend until a portion does not overlap with the shield plate, so that, when the shield plate is seen from above, a portion of the magnetic body is exposed.

In this invention, the magnetic body may comprise a plurality of members, each formed from the ferromagnetic material.

A position input device of this invention, comprising a position indicator which indicates positions and a position detection device which detects positions indicated by the position indicator by means of electromagnetic inductive action with the position indicator, and which outputs information indicating a position detected by the position detection device, is characterized in that the position detection device comprises a sense portion having a plurality of coils, has a shield plate positioned below the sense portion, and has a magnetic body, of a ferromagnetic material other than iron, positioned such that there is overlap with at least a portion of the surface of the shield plate.

According to this invention, a shield plate is positioned below a sense portion having a plurality of coils in a position detection device which detects positions indicated by a position indicator, and a magnetic body of a ferromagnetic material other than iron is positioned so as to overlap at least a portion of the surface of the shield plate; by this means, the inductance of the coils of the sense portion is increased, so that even when the sense portion is reduced in size, the peripheral circuitry placement may be dense, or other changes may be made to reduce the size of the position detection device, the position of the position indicator can be detected precisely and reliably.

BRIEF DESCRIPTION OF THE DRAWINGS

FIG. 1 shows in summary the configuration of the coordinate input device of an aspect, to which this invention has been applied;

FIG. 3 shows the state of placement of a group of loop coils positioned in the sensor substrate;

FIG. 7B is a graph of the measurement results;

FIG. 23B is a graph illustrating measurement results for a case in which a metal layer is provided.

DESCRIPTION OF THE PREFERRED EMBODIMENT(S)

Figure 2A:
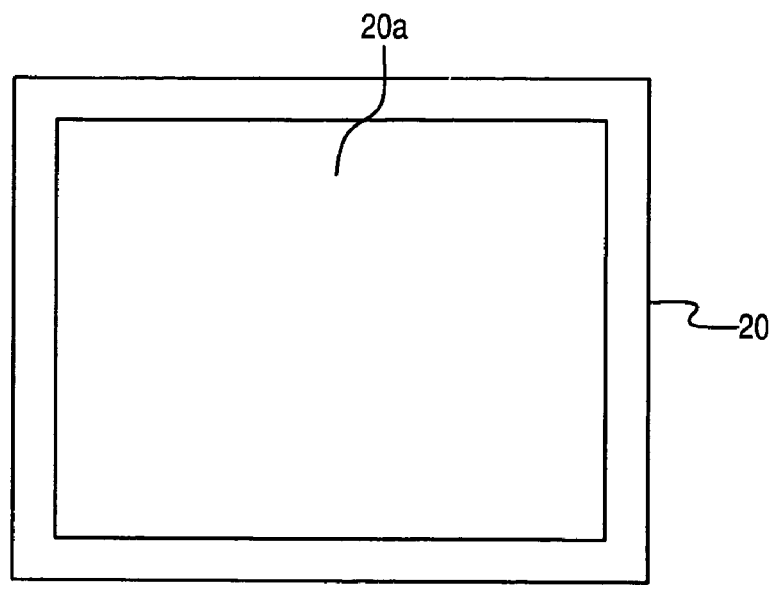
FIG. 2A and FIG. 2B is a cross-sectional view of a tablet according to the invention.

Below, embodiments of the invention are explained referring to the drawings.

FIG. 1 shows in summary the configuration of a coordinate input device, as a position input device of an aspect to which this invention is applied. As shown in FIG. 1, the coordinate input device 1 comprises an input pen (coordinate indicator) 10, which the user holds in his hand to operate the device, and a tablet 20 having an operation surface 20a, which serves as an operation base.

The input pen 10, serving as the position indicator, is of a shape which mimics a ballpoint pen or other general stylus; a core 11 protrudes at the tip. The user holds the input pen 10 in his hand and presses the core 11 against the operation surface 20a of the tablet 20 while moving the pen to perform an operation.

The tablet 20, serving as the position detection device, detects the position of the input pen 10 on the operation surface 20a, and, when the core 11 of the input pen 10 is pressed down in an operation, detects this operation. Further, the tablet 20 incorporates a detection circuit portion 100 which performs processing to detect the operation position of the input pen 10. The detection circuit portion 100 is connected to electronic equipment 49 which utilizes the tablet 20 as an input device. The electronic equipment 49 comprises a display device 50 and an output device 51.

Figure 2B:
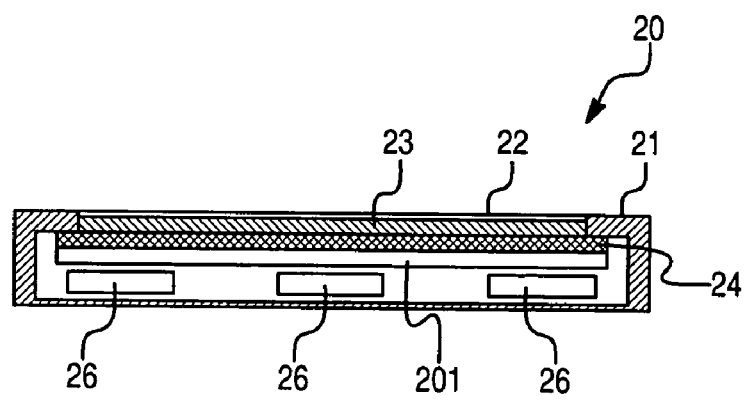

FIG. 2 are drawings of the configuration of the tablet 20, showing a plan view in FIG. 2A and a cross-sectional view in FIG. 2B.

In the following explanation, the side of the tablet 20 which is side of the operation surface 20a (the upper side) is called the front side, and the opposite side is called the rear side.

As shown in FIG. 2B, the tablet 20 has a hollow housing 21 formed in a plate shape, and on the floor portion within the housing 21 is positioned the peripheral circuitry 26. The peripheral circuitry 26 includes various circuits, comprising a detection circuit portion 100 which performs computational processing related to detection of position of the input pen 10.

A surface sheet 22 is positioned on the surface of the tablet 20. The surface sheet 22 is, for example, a transparent or opaque sheet of a synthetic resin having flexibility, and is used as the operation surface 20a for operation of the input pen 10. The surface sheet 22 is the surface onto which the core 11 is brought into contact during operation, and so the surface should be such as to result in an appropriate amount of friction with the core 11, such that the sensation of use with the input pen 10 is optimal.

A panel 23 is positioned below the surface sheet 22. The panel 23 is a plate-like member formed from a material (for example a synthetic resin) which enables the transmission of signals sent and received between the input pen 10 and the tablet 20, and is set in the housing 21.

Further, a sensor substrate 24, used as a sense portion, and a shield portion 201, are positioned, overlapping, below the panel 23. The sensor substrate 24 is a printed board on which are formed groups of loop coils 28, 29 as best shown in FIG. 3. The shield portion 201 is positioned below the sensor substrate 24, covering the rear face of the sensor substrate 24, and exhibits both an electromagnetic shielding effect of attenuating or blocking noise from the peripheral circuitry 26 which would reach the sensor substrate 24, and an effect of reducing scattering in the reception intensity within the surface of the sensor substrate 24 when the sensor substrate 24 receives signals sent from the input pen 10.

In this way, in the tablet 20, a housing 21 houses, in order from below, the peripheral circuitry 26, shield portion 201, sensor substrate 24, panel 23, and surface sheet 22. The surface sheet 22 serves as the upper surface of the housing 21.

The surface sheet 22 and panel 23 are formed in the same size. Further, the sensor substrate 24 and shield portion 201 are formed in substantially the same shape and size; the sensor substrate 24 and shield portion 201 are larger in size than the surface sheet 22 and panel 23.

FIG. 3 shows the placement of groups of loop coils 28, 29 positioned in the sensor substrate 24. The loop coil groups 28, 29 in FIG. 3 are positioned over a range which includes the operation surface 20a as best shown in FIG. 2A.

As indicated by the arrows in FIG. 3, a virtual X-Y orthogonal coordinate system is adopted in which the directions of the X axis and Y axis are equivalent to the horizontal and vertical directions in the operation surface 20a.

The loop coil group 28 comprises a plurality of (for example, 48) loop coils 28-$i$ ($i$=1, 2, ..., 48) arranged along the X-axis direction. The loop coils 28-$i$ are single-turn loop coils extending along the Y axis; the loop coils 28-$i$ are all mutually parallel, and moreover are positioned so as to overlap. The loop coil group 29 comprises a plurality of (for example, 48) loop coils 29-$i$ ($i$=1, 2, ..., 48) arranged along the Y-axis direction. The loop coils 28-$i$ are single-turn loop coils extending along the X axis; the loop coils 29-$i$ are all mutually parallel, and moreover are positioned so as to overlap.

In the region in which the loop coil groups 28, 29 in FIG. 3 are positioned, signals transmitted from the input pen 10 can be received by the table 20, as explained below. That is, the region in which the loop coil groups 28, 29 are positioned functions as the effective area in which the position of and operations by the input pen 10 can be detected. In the coordinate input device 1, this effective area is configured so as to overlap with the operation surface 20a.

These loop coil groups 28, 29 are realized by means of printed patterns in one or a plurality of layers in the sensor substrate 24. Each of the loop coils 28-$i$, 29-$i$ need not consist of a single turn, but can be a plurality of turns as necessary.

Figure 4:
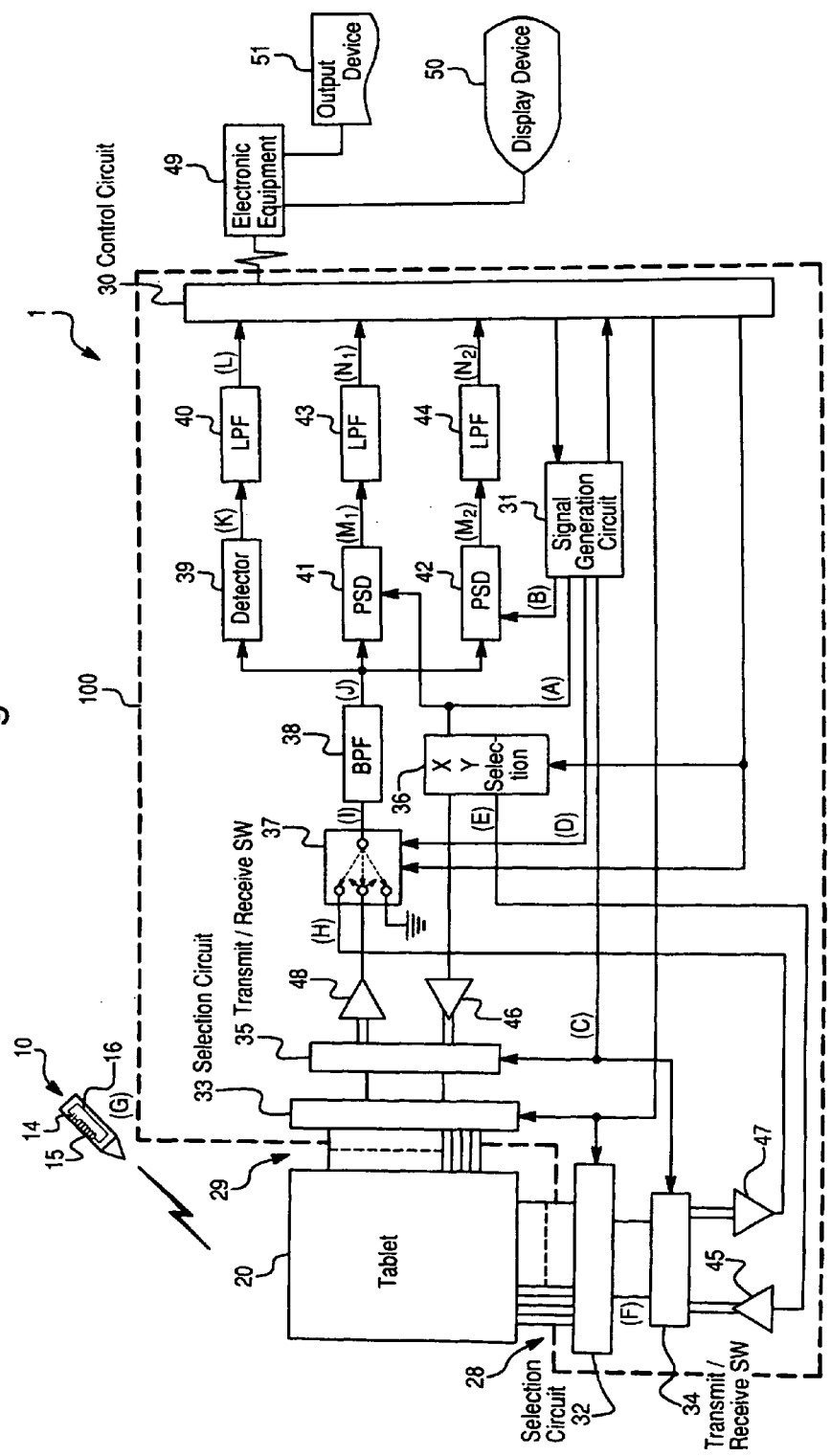
FIG. 4 is a circuit diagram showing in detail the configuration of a coordinate input device.

FIG. 4 is a circuit diagram showing in detail the configuration of the coordinate input device 1.

The input pen 10 incorporates a resonance circuit 16, comprising a capacitor 14 and coil 15 mounted on an internal board (not shown.) The resonance circuit 16 transmits and receives wireless signals to and from the loop coil groups 28, 29 of the table 20 at a prescribed frequency. The input pen 10 is configured such that the inductance of the coil 15 changes according to the pressing pressure applied to the core 11. By this means, when pressing pressure is applied to the core 11 during operation of the input pen 10, the resonance frequency of the resonance circuit 16 changes.

The detection circuit portion 100 incorporated within the housing 21 of the table 20 comprises a control circuit 30, signal generation circuit 31, X-direction selection circuit 32, Y-direction selection circuit 33, send/receive switching circuits 34 and 35, XY switching circuit 36, reception timing switching circuit 37, band-pass filter (BPF) 38, detector 39, low-pass filter (LPF) 40, phase-shift detectors (PSD) 41 and 42, low-pass filters (LPFs) 43 and 44, driving circuits 45 and 46, and amplifiers 47 and 48. These portions are all housed within the housing 21 of FIG. 2A of the tablet 20.

The detection circuit portion 100 is connected to electronic equipment 49, comprising a display device 50 and output device 51. The electronic equipment 49 is equipment capable of receiving input through use of the input pen 10, and is, for example, configured as a personal computer, PDA (Personal Digital Assistant), portable terminal device with wireless communication functions, or similar, with an LCD (Liquid Crystal Display) or other display device 50 either provided integrally or as an external device. The output device 51 is configured as a printing device, wireless communication device, various disk drives, various semiconductor memory devices, or similar, either integrally with the electronic equipment 49, or externally connected to the electronic equipment 49.

The detection circuit portion 100 shown in FIG. 4 repeatedly executes transmission actions and reception actions at a prescribed interval, in order to detect operation of the input pen 10. In a transmission action, electric waves are transmitted from the loop coils 28-$i$, 29-$i$ of the tablet 20 (FIG. 3) to the resonance circuit 16. By means of these electric waves, a current is induced in the resonance circuit 16. In the resonance circuit 16, electric waves are generated by the coil 15 based on the induced current. These electric waves are received by the loop coil groups 28 and 29 during the reception action, and based on these electric waves, the position of the input pen 10, whether a depressing operation on the core 11 has been performed, and the depressing pressure (stylus pressure) applied to the core 11, are detected.

The control circuit 30 controls the signal generation circuit 31, and also controls switching between the loop coils of the loop coil groups 28 and 29 by the selection circuits 32, 33. The control circuit 30 also controls the XY switching circuit 36 and reception timing switching circuit 37, and causes switching of the coordinate detection direction (X direction and Y direction). Further, the control circuit 30 performs analog/digital (A/D) conversion of values output from the low-pass filters 40, 43, 44, and executes prescribed computational processing to compute the coordinate values of the position indicated by the input pen 10, as well as detecting the phase of the received signals, and sends these to the electronic equipment 49.

The selection circuit 32 selects one loop coil from among the X-direction loop coil group 28 as controlled by the control circuit 30. Also, the selection circuit 33 selects one loop coil from among the Y-direction loop coil group 29 as controlled by the control circuit 30.

The send/receive switching circuit 34 alternately connects the one X-direction loop coil selected by the selection circuit 32 to the driving circuit 45 and to the amplifier 47, according to a send/receive switching signal C input from the signal generation circuit 31. The send/receive switching circuit 35 alternately connects the one Y-direction loop coil selected by the selection circuit 33 to the driving circuit 46 and to the amplifier 48, according to a send/receive switching signal C.

The signal generation circuit 31 generates and outputs square-wave signals A at a prescribed frequency f0, signals B which lag by 90° the phase of the square-wave signals A, send/receive switching signals C at a prescribed frequency fk, and reception timing signals D. The square-wave signals A output from the signal generation circuit 31 are transmitted to the phase detector 41, and are also converted into sine-wave signals E by a low-pass filter (not shown), and are then sent to one of the driving circuits 45 and 46, via the XY switching circuit 36. The square-wave signals B output from the signal generation circuit 31 are sent to the phase detector 42, and the send/receive switching signals C are sent to the send/receive switching circuits 34 and 35, while the reception timing signals D are sent to the reception timing switching circuit 37.

In a state in which information to select the X direction is output from the control circuit 30 and is input to the XY switching circuit 36 and to the reception timing switching circuit 37, the sine-wave signals E output from the signal generation circuit 31 are transmitted to the driving circuit 45 and converted into balanced signals, which are further sent to the send/receive switching circuit 34. Here, the send/receive switching circuit 34 switches to connect to either the driving circuit 45 or to the amplifier 47 based on the send/receive switching signal C, so that signals output from the send/ receive switching circuit 34 to the selection circuit 32 become signals F which are repeatedly output and halted at each time interval T (=½fk). Signals F output from the send/receive switching circuit 34 pass through the selection circuit 32 and are sent to the one selected loop coil 28-*i* among the loop coil group 28. In the selected loop coil 28-*i*, electric waves are generated based on this signal F.

While the signal F is being output, the detection circuit portion 100 executes the above sending action. While the signal F is not being output, the receiving action is executed. The sending action and the receiving action are repeated alternatively during each time interval T.

In When the input pen 10 is held in a state of use on the operation surface 20*a* of the tablet 20, electric waves generated by the loop coils 28-*i* excite the coil 15 of the input pen 10, and by means of the resonance circuit 16, an induced voltage G, synchronized with the signal F, is generated.

Thereafter, the action of the send/receive switching circuit 34 causes a transition to a receive action. When the loop coil 28-*i* is switched to the amplifier 47, the electric wave from the loop coil 28-*i* immediately disappears, and the induced voltage G in the resonance circuit 16 of the input pen 10 is gradually attenuated according to losses within the resonance circuit 16. Due to the current flowing in the resonance circuit 16 as a result of this induced voltage G, an electric wave is generated by the coil 15. The electric wave generated from the coil 15 excites the loop coil 28-*i* connected to the amplifier 47, and an induced voltage occurs due to the electric wave from the loop coil 28-*i*. This induced voltage is transmitted from the send/receive switching circuit 34 to the amplifier 47 only during the interval of the reception action, and is amplified to become a received signal H, which is sent to the reception timing switching circuit 37.

Information specifying either the X direction or the Y direction, and a reception timing signal D which is effectively the result of inverting the send/receive signal C, are input to the reception timing switching circuit 37. The reception timing switching circuit 37 outputs a receive signal H during the interval in which the signal D is at "High" level, and does not output anything while at "Low" level. Hence, a signal I which is effectively the same as the receive signal H is output to the band-pass filter 38.

The band-pass filter 38 is a ceramic filter with characteristic frequency equal to the frequency f0. A signal J having an amplitude corresponding to the energy of the component of the signal I at frequency f0 is sent to the detector 39 and the phase-shift detectors 41, 42. In a state in which several signals I are input to the band-pass filter 38 and have converged, the band-pass filter 38 sends these signals J to the detector 39 and to the phase-shift detectors 41, 42.

Signals J input to the detector 39 are detected and rectified to become signals K, after which they are converted into DC signals L, having a voltage value Vxi corresponding to substantially ½ the amplitude, by a low-pass filter 40 with sufficiently low cutoff frequency, and these are sent to the control circuit 30.

The voltage value Vxi of a signal L is based on the induced voltage which is induced in a loop coil 28-*i*, and indicates a value which depends on the distance between the input pen 10 and the loop coil 28-*i*. Here, the value is inversely proportional to substantially the fourth power of the distance. Consequently, when the loop coil 28-*i* is switched between different loop coils, the voltage values Vxi of the signals L in the loop coils will have different values.

Hence in the control circuit 30 the voltage values Vxi obtained for different loop coils are converted into digital values, and by executing computational processing, described below, of the digital values, to compute the positional relationship between each of the loop coils and the input pen 10, the X-direction coordinate value of the position indicated by the input pen 10 can be obtained. The Y-direction coordinate value of the position indicated by the input pen 10 is similarly obtained. By this means, coordinates representing the position of the input pen 10 on the operation surface 20*a* are obtained.

On the other hand, the square-wave signals A generated by the signal generation circuit 31 are input as detection signals to the phase-shift detector 41, and the square-wave signals B, lagging the phase of the square-wave signals A by 90°, are input as detection signals to the phase-shift detector 42. When the phase of a signal J substantially matches the phase of the square-wave signal A, the phase-shift detector 41 outputs a signal M1 having a waveform similar to that of a full-wave rectified signal, while the phase-shift detector 42 outputs a signal M2 having a waveform which is symmetrical on the positive and negative sides. The signal M1 output from the phase-shift detector 41 is effectively the same as the signal K. The signal M1, similarly to the above signal K, is converted by the low-pass filter 43 into a DC signal N1 has a voltage value which corresponds to substantially ½ the amplitude of the signal J, that is, Vxi, and this signal is sent to the control circuit 30. Here, the DC signal N1 is effectively the same as the signal L. Further, the signal M2 is similarly converted by the low-pass filter 42 into a DC signal N2, which is sent to the control circuit 30.

The control circuit 30 converts the output values of the low-pass filters 43 and 44, here called the signals N1 and N2, into digital values, and uses the digital values thus obtained in prescribed computational processing to compute the phase difference θ between the signals applied to the phase-shift detectors 41 and 42, here called the signal J and the square-wave signal A.

The phase of the signal J corresponds to the resonance frequency of the resonance circuit 16 in the input pen 10. That is, when the resonance frequency of the resonance circuit 16 coincides with the prescribed frequency f0, an induced voltage at frequency f0 occurs in the resonance circuit 16 during both transmission action and during reception action, and, an induced current synchronous with this flows, so that the frequency and phase of the received signal H (or I) coincide with those of the square-wave signal A, and the phase of the signal J also coincides with that of the square-wave signal A.

On the other hand, when the resonance frequency of the resonance circuit 16 does not coincide with the prescribed frequency f0, if for example the frequency is slightly lower than the frequency f0 (f1<f0, and moreover f1 is nearly equal to f0), then an induced voltage at frequency f0 occurs in the resonance circuit 16 during the transmission action, and an induced current with a lagging phase flows in the resonance circuit 16 due to this induced voltage. Then, during the reception action an induced voltage substantially at frequency f1 occurs, and an induced current flows in synchronization with this, so that the frequency of the received signal H (or I) is slightly lower than the frequency of the square-wave signal A, and the phase also lags slightly. As explained above, the band-pass filter 38 has as its characteristic frequency only the frequency f0, and so the shift toward a lower frequency of the input signal is output as a phase shift, and therefore the phase of the signal J is delayed further from the received signal H (or I).

Conversely, if the resonance frequency of the resonance circuit 16 is slightly higher than the prescribed frequency f0, when for example the frequency is f2 (f2>f0, and f2 is nearly equal to f0), then during the transmission action an induced voltage at frequency f0 occurs in the resonance circuit 16, and an induced current flows in the resonance circuit 16 accompanying the advance in phase. During the reception action an induced voltage substantially at frequency f2 occurs and an induced current in synchronization with this flows, so that the frequency of the received signal H (or I) is slightly higher than the frequency of the square-wave signal A, and the phase leads somewhat. In the band-pass filter 38, this shift toward higher frequencies of the input signal is output as a phase advance, opposite to the case described above, and so the phase of the signal J further leads that of the received signal H (or I).

As explained above, the coil 15 of the resonance circuit 16 is configured such that the inductance changes when a depressing pressure is applied to the core 11. When pressure is applied to the core 11, such as by pressing input pen 10 against operation surface 20a, the inductance increases. Hence when an operation is performed in which the core 11 of the input pen 10 is pressed against the operation surface 20a, the inductance of the coil 15 increases, and the resonance frequency of the resonance circuit 16 changes to a lower frequency. Consequently, as explained above, whether there has been an operation with the input pen 10, and the force applied to the core 11 at the time of the operation, can be detected from the value of the phase difference θ obtained by computational processing of the control circuit 30.

Figure 5A:
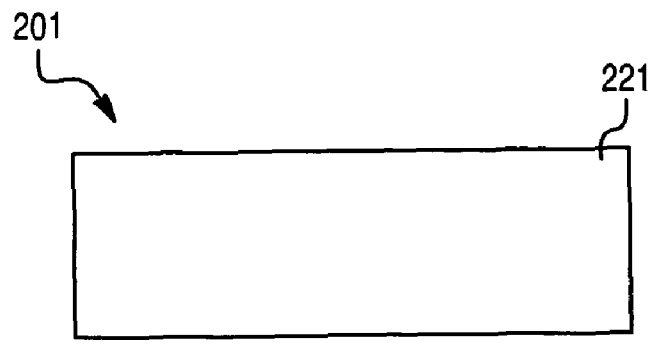
FIG. 5A is a plan view showing the upper-face side.
Figure 5B:
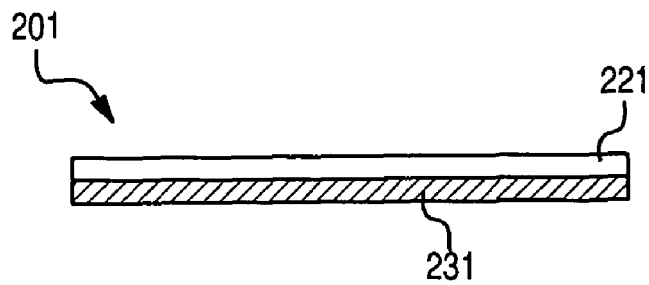
FIG. 5B is a front elevational view.
Figure 5C:
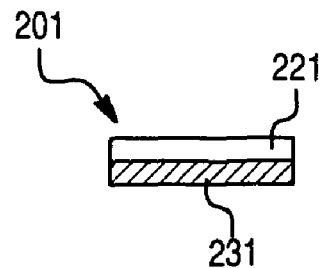
FIG. 5C is a side elevational view.

FIG. 5A is a plan view showing the upper-face side of shield portion 201, FIG. 5B is a front elevational view, and FIG. 5C is a side elevational view.

As shown in FIGS. 5a-c, the shield portion 201 is configured with a shield layer 231 provided on the rear side of the shield plate 221. The shield plate 221 is of size and shape such as to cover the region in which the loop coil groups 28 and 29 are positioned on the sensor substrate as best shown in FIG. 3. The shield layer 231 covers substantially the entirety of the rear surface of the shield plate 221.

Here, the configuration of the shield portion 201, and the materials used in the shield plate 221 and shield layer 231, are studied.

As explained above, in the coordinate input device 1, there is the possibility of a decrease in reception sensitivity at the end portions of the operation surface 20a, that is, at the end portions of the region in which the loop coil groups 28, 29 are positioned. This is thought to be because, whereas numerous magnetic flux lines pass through the coil of the input pen 10 from the loop coils in the center of the operation surface 20a, at the ends of the operation surface 20a, the magnetic flux lines of the loop coils intersect the center axis of the coil of the input pen 10 at an angle which is close to a right angle, so that only a small amount of magnetic flux passes through the coil of the input pen 10. Further, when a metal plate (in particular a metal plate of broad area) is present directly below the shield portion 201, eddy current losses cause a further reduction in the magnetic flux lines, so that the decline in reception sensitivity becomes pronounced.

The reception intensity in the loop coil groups 28 and 29 is affected not only by the number of loop coils, but also by the configuration of the shield portion 201. As explained above, the shield portion 201 has an electromagnetic shielding effect, and also the effect of reducing scattering in the reception intensity within the plane of the sensor substrate 24. Such an effect can also be obtained from the shield plate 221 alone, but in that case the phenomenon of the related art in which the reception sensitivity declines at the end portions still occurs. Hence the applicants studied configurations of the shield portion 201 which might be capable of resolving the above-described problem.

In these studies, it was necessary to modify the configuration of the shield portion 201 while measuring the reception intensity. The reception intensity in the tablet 20 is strongly correlated with the inductance when the input pen 10 is held close to the shield portion 201. Hence in place of the coil comprised by the input pen 10, the applicants used a cursor coil 17 suited to more accurate measurements, and by bringing this cursor coil 17 into close contact with the shield portion 201 and measuring the inductance, the effect on the reception sensitivity of the input pen 10 was studied.

Figure 6A:
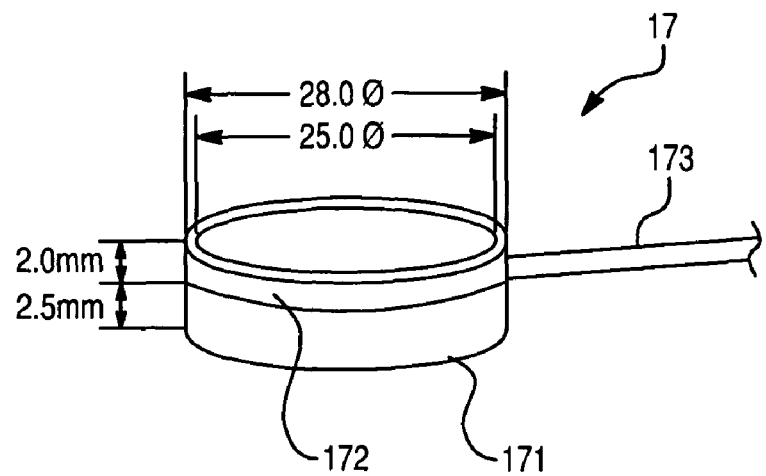
FIG. 6A is a perspective view of the configuration of a cursor coil.

FIG. 6A is a perspective view of the configuration of the cursor coil 17. The cursor coil 17 in FIG. 6A comprises a pedestal 171, coil 172, and lead wires 173. The coil 172 is an air-core coil formed by winding Litz wire (in which five core wires 0.07 in diameter are twisted) in a ring shape of outer diameter 28.0 mm and inner diameter 25.0 mm for 40 turns (five turns in the radial direction by eight turns in the height direction. The ends of this Litz wire are connected to the lead wires 173. The coil 172 is fixed onto the pedestal 171, which is formed of synthetic resin, which is brought into contact with the operation surface 20a. The height of the coil 172 is 2.0 mm, and the height of the pedestal 171 is 2.5 mm.

Figure 6B:
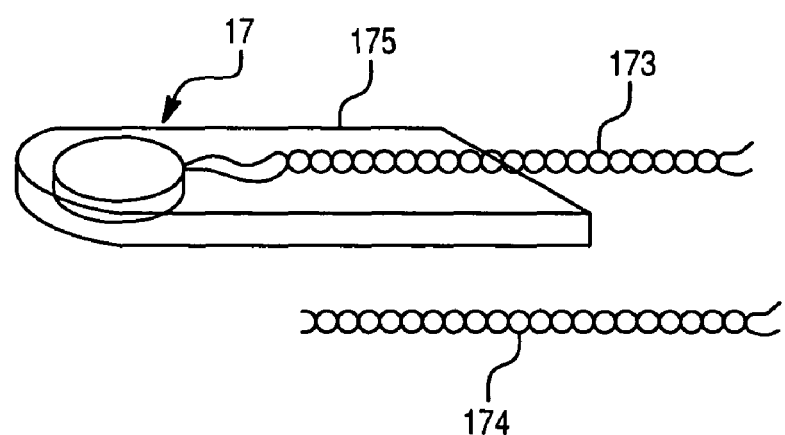
FIG. 6B is a perspective view illustrating the state of the cursor coil being housed in the cursor body.

The cursor coil 17 is housed within a cursor body 175 such as shown in FIG. 6B. The cursor body 175 is the body of a cursor, well-known as one type of input device, and is a hollow case formed from a synthetic resin or the like. In the cursor body 175 are placed, together with the cursor coil 17 shown in FIG. 6A, corrective lead wires 174 to cancel the effect on the inductance of the lead wires 173. In a state in which the cursor coil 17 is placed within the cursor body 175, the bottom face of the cursor body 175 is in the same plane as the lower face of the pedestal 171, and the coil 172 is positioned 2.5 mm above the lower face of the cursor body 175.

In the state in which the cursor coil 17 is placed within the cursor body 175, a lens (not shown) is mounted to cover the ring of the coil 172. A marker (not shown) is formed on the lens indicating the center position (center of the ring) of the coil 172. In the measurements described below, the inductance was measured with reference to the center position of the coil 172 as indicated by this marker.

In the state of being placed within the cursor body 175, the cursor coil 17 has an air core (with the condition that there exist no magnetic bodies, metal materials or the like in the vicinity), and has as a characteristic an inductance of 80.0 μH (microhenries) at 375 kHz (kilohertz). When the inductance is not 80 μH, correction is performed. This correction is performed at the same ratio as when fabricating another cursor coil and using the cursor coil to measure the shield plate inductance, with conversion performed such that in the air-core state the inductance is 80 μH.

By housing the cursor coil 17 shown in FIG. 6A and FIG. 6B in the cursor body 175, and holding this close against the shield portion 201 to measure the inductance of the cursor coil 17, the effect of the configuration of the shield portion 201 on the reception intensity of the tablet 20 can be determined in approximation. In this aspect, measurements were performed using a cursor coil 17 housed in a cursor body 175. Similar measurements can be performed by removing the cursor coil 17 from the cursor body 175 for use.

Figure 7A:
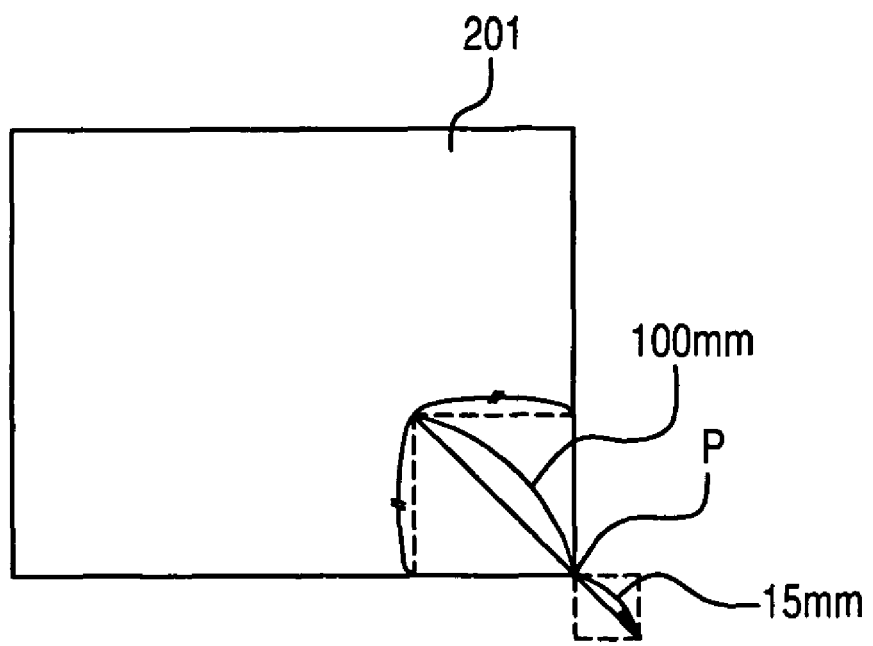
FIG. 7A illustrates the inductance measurement method.

Next, the method of measurement using the cursor coil 17 and measurement results are shown in FIGS. 7 A and B. In measurements, as shown in FIG. 7A, the inductance of the cursor coil 17 at 375 kHz was measured while moving the cursor coil 17 above the shield portion 201, as indicated by the arrow in the figure.

During measurements, the position of the cursor coil 17 (the center position of the coil 172) passes through the point P (end point) at a corner of the shield portion 201, and is moved along a straight line extending at an angle of 135° with the X axis. This straight line is the locus of points at equal distance from the two edges which intersect at the end point P, as seen in FIG. 7A.

The motion of the cursor coil 17 has as its starting point the point within the shield portion 201 at a distance of 100 mm (millimeters) from the end point P on the above straight line, and after passing through the end point P, has as the ending point the point 15 mm distant from the end point P on the outside of the shield portion 201.

FIG. 7B is a graph showing the measurement results. The figure, the horizontal axis indicates the distance on the straight line from the end point P (−100 mm to 15 mm), and the vertical axis indicates the inductance of the cursor coil 17.

The measurement results of FIG. 7B are results when using, as the shield plate 221, an 0.5 mm thick plate of silicon steel containing from 1 to 4 weight percent silicon (hereafter called "Si steel plate (1-4 wt %)"). (1) is an example in which, as the shield layer 231, an 0.08 mm thick amorphous magnetic alloy ribbon (after heat treatment) was used; (2) is an example in which 0.5 mm thick Si steel plate was used as the shield layer 231; (3) is an example in which 0.5 mm thick steel plate (iron plate) was used as the shield layer 231; and (4) is an example in which no shield layer 231 is provided (contrasting example). However, a 1 mm thick aluminum sheet exists directly below the shield portion 201, over an area broader than the shield portion 201.

As indicated in FIG. 7B, in the example (1) using the amorphous magnetic alloy ribbon as the shield layer 231, compared with the example (4) in which no shield layer 231 was provided, the inductance was increased sharply. In the example (2) using the Si steel plate (1-4 wt %) as the shield layer 231 also, that is, when using the same material as the shield plate 221 in the shield layer 231, the inductance was found to rise sharply. On the other hand, in example (3) using the steel plate as the shield layer 231, the results were similar to those of example (4) in which no shield layer 231 was provided, indicating that the shield layer 231 had almost no effect.

Figure 8:
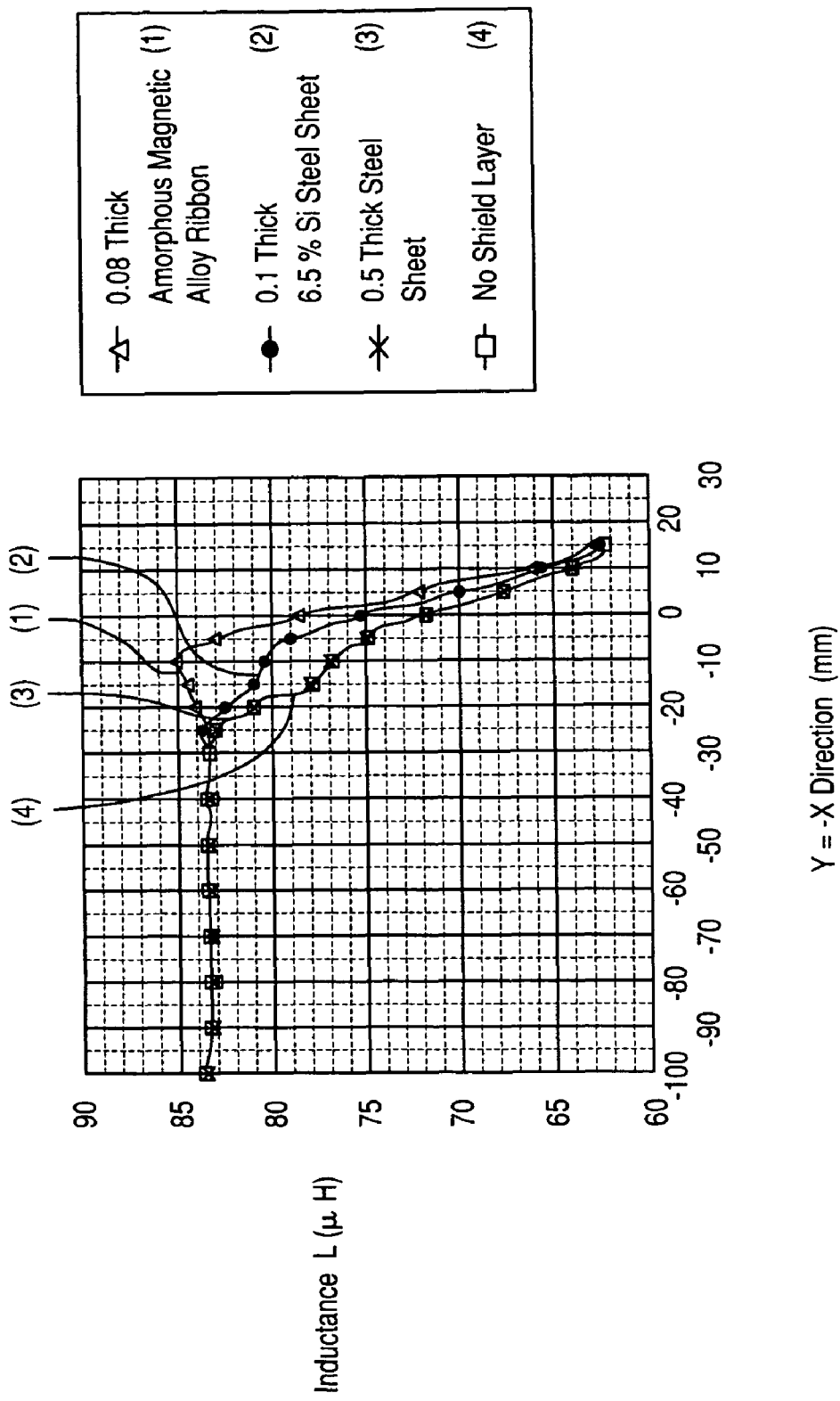
FIG. 8 is a graph illustrating the results of measurement of the inductance by the method shown in FIG. 7A.

FIG. 8 is a graph showing the results of measurements of the inductance of the cursor coil 17, for cases in which 0.1 mm thick 6.5% Si steel (steel containing 6.5 weight percent silicon) was used as the shield plate 221, measured using the method of FIG. 7A. In FIG. 8, (1) is an example using, as the shield layer 231, 0.08 mm thick amorphous magnetic alloy ribbon (after heat treatment); (2) is an example using 6.5% Si steel plate 0.1 mm thick as the shield layer 231; (3) is an example using 0.5 mm thick steel plate as the shield layer 231; and (4) is an example in which no shield layer 231 is provided (contrasting example). However, a 1 mm thick aluminum sheet exists directly below the shield portion 201, over an area broader than the shield portion 201.

In the results shown in FIG. 8 also, it is clear that in the example (1) using the amorphous magnetic alloy ribbon as the shield layer 231, the inductance is markedly higher than the example (4) with no shield layer 231 provided. And in the example (2) using 6.5% Si steel plate as the shield layer 231 also, that is, using the same material in the shield layer 231 as in the shield plate 221, the inductance was sharply higher. On the other hand, in example (3) using the steel plate as the shield layer 231, the result is similar to that of example (4) with no shield layer 231 provided, and so the shield layer 231 has almost no effect.

From the above results, as the shield layer 231, use of 0.08 mm thick amorphous magnetic alloy ribbon (after heat treatment), 0.1 mm thick 6.5% Si steel plate and 0.5 mm thick Si steel plate (1-4 wt %), is effective. When steel plate is used there is almost no effect.

Considering the principle by which the inductance is increased by the shield layer 231, it is thought that use of materials with high relative permeability in the shield portion 201 has a large effect. The relative permeability of each of the materials is strongly correlated with the inductance of the material, so that by selecting materials using this as a measure of the inductance, it is thought that desirable results can be obtained.

Hence as one example, studies were conducted on various materials focusing on the inductance which is strongly correlated with the relative permeability, and it was found that in cases in which, in addition to the above-described 0.08 mm thick amorphous magnetic alloy ribbon (after heat treatment) and 0.1 mm thick 6.5% Si steel plate, 0.5 mm thick Si steel plate (1-4 wt %), 0.2 mm thick Si steel plate (1-4 wt %), NiCr alloy (nickel-chromium-iron alloy), PB permalloy, PC permalloy, and 42-Ni plate (42 nickel-iron alloy plate) were used, a significant difference with the contrast example was observed. Here the inductance was, as one example, the inductance at 375 kHz.

As an opposing effect, the applicants found that when aluminum plate is positioned in proximity to the sensor substrate 24, the reception intensity in the tablet 20 is greatly decreased. Hence it became clear that nonmagnetic metal materials are inappropriate as materials used to form the shield portion 201.

Below, the above-described materials, and their inductances and relative permeabilities (where known) are listed.

1. Aluminum plate: Inductance 59.1 μH, maximum relative permeability (μm) 1, initial relative permeability (μi) 1

2. Steel plate: Inductance 60.7 μH, maximum relative permeability 6000 to 9000, initial relative permeability 200 to 300

3. 0.5 mm thick Si steel plate (1-4 wt %): Inductance 75.3 μH, maximum relative permeability 7000 to 13,000, initial relative permeability (lower limit) 1500

4. 0.2 mm thick Si steel plate (1-4 wt %): Inductance 78.5 μH 5. 0.2 mm thick NiCr alloy plate: Inductance 82.8 μH 6. 0.1 mm thick 6.5% Si steel plate: Inductance 83.0 μH, maximum relative permeability (lower limit) 23,000

7. PB permalloy: Inductance 88 μH, maximum relative permeability 40,000 to 50,000, initial relative permeability 4000 to 6000

8. 0.125 mm thick 42-Ni alloy plate: Inductance 90.2 μH, initial relative permeability (lower limit) 4500

9. Amorphous magnetic alloy plate (before heat treatment): Inductance 90 μH, maximum relative permeability (lower limit) 45,000

10. PC permalloy: Inductance 93.5 μH, maximum relative permeability 120,000 to 300,000, initial relative permeability 15,000 to 40,000

11. Amorphous magnetic alloy plate (after heat treatment): Inductance 98.2 μH, initial relative permeability 30,000 to 50,000

Of these, because 1, the aluminum plate, is nonmagnetic, there is no effect gained by including it in the shield portion 201. In addition, due to eddy current losses, the inductance at 375 kHz is lowered. When 2, the steel plate, is used, there is no effect obtained in increasing the reception intensity of the tablet 20, as was explained above.

On the other hand, clearly when each of the materials 3 through 11 is used, an effect in increasing the reception intensity of the tablet 20 is obtained.

Hence a ferromagnetic material other than iron is desirable to use in forming the shield layer 231. For example, when inductance is used as an index, a material with an index of 75 µH or higher may be used. When the maximum relative permeability is used as an index, a material with a value of 7000 or higher may be used. When the initial relative permeability is used as an index, a material with a value of 1500 or higher may be used. Still more desirable results are obtained by using any one among, for example, Si steel plate (1-4 wt %), NiCr alloy plate, 6.5% Si steel plate, PB permalloy, 42-Ni alloy plate, amorphous magnetic alloy plate (before heat treatment), PC permalloy, and amorphous magnetic alloy plate (after heat treatment). And because an effect is obtained even when the shield layer 231 is thin, no restrictions in particular are placed on the thickness, and it is thought that the above materials may be appropriately used in foil form.

With respect to Si steel plate, in addition to that described above, a similar effect is obtained by for example using silicon steel plate containing from 4.0 to 7.0 weight percent silicon.

Further, the applicants studied the effect of forming the shield layer 231 from a plurality of layers.

As the reason for the improvement in reception intensity in the tablet 20 by providing a shield layer 231 in addition to a shield plate 221 in the shield portion 201, it is conceivable that magnetic flux line diversion occurs at the plane between the shield plate 221 and the shield layer 231. That is, it is thought that when the shield portion 201 comprises only the shield plate 221, the magnetic flux lines are diverted to the rear face of the shield plate 221, whereas when a shield layer 231 is further provided, rather than the rear face of the shield plate 221, the magnetic flux lines are diverted to the rear face of the shield layer 231, so that the reception intensity of the tablet 20 is further heightened.

Hence the applicants used, as the shield layer 231, a layer formed by stacking a plurality of layers of a ferromagnetic material, and studied the effect thereof. The results appear in FIG. 9.

Figure 9:
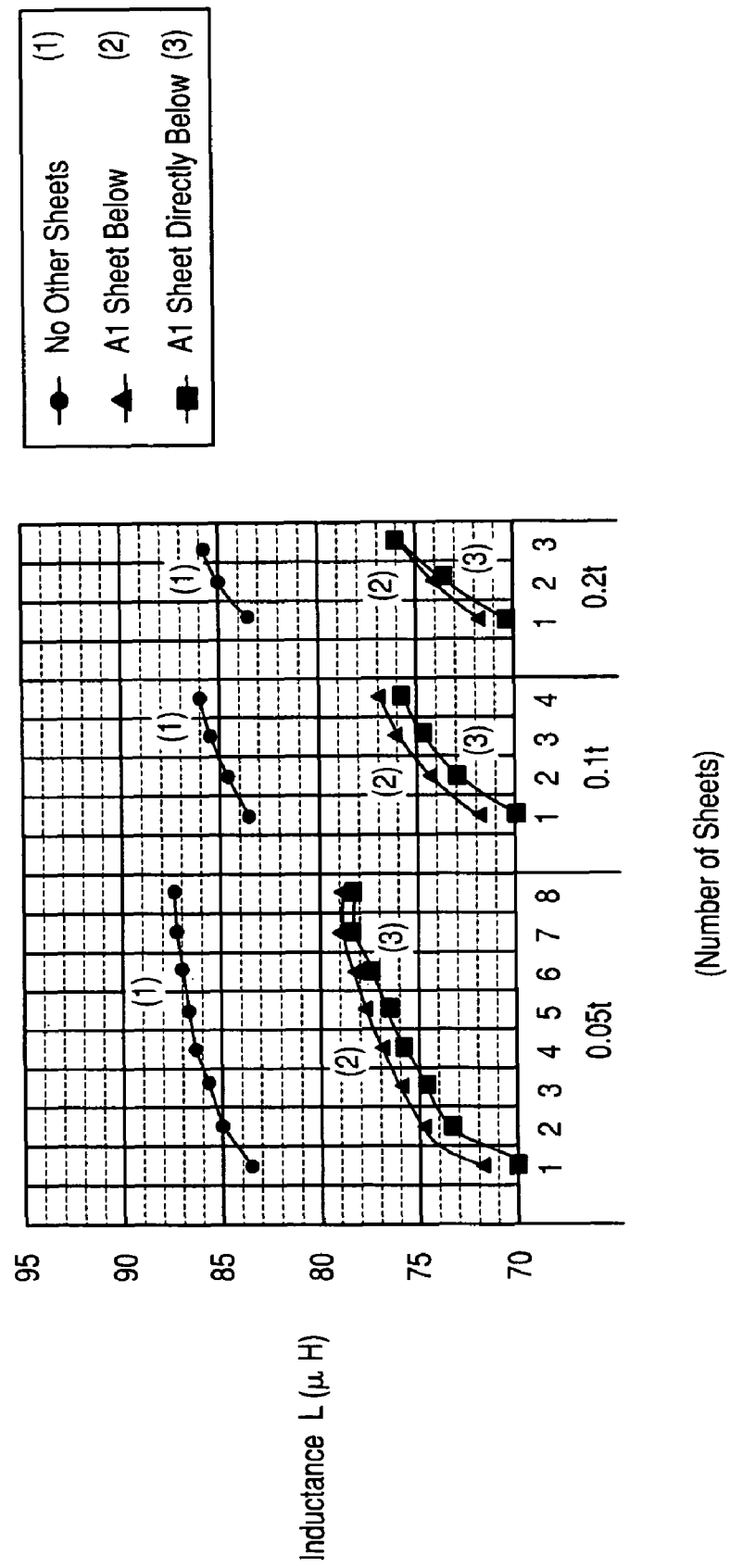
FIG. 9 is a graph illustrating the correlation between the number and thickness of shield layers and the inductance.

FIG. 9 is a graph showing the correlation between the number of layers and thickness in the shield layer 231 and the inductance, when a shield layer 231 consisting of 6.5% Si steel sheet was provided on the shield plate 221 of 6.5% Si steel plate. Changes in inductance when the position of the cursor coil 17 (the center position of the coil 172) overlapped with a corner of the shield portion 201 are shown, for cases in which the shield layer 231 is formed from 1 to 8 layers of 0.05 mm thick 6.5% Si steel sheet, from 1 to 4 layers of 0.1 mm thick 6.5% Si steel sheet, and from 1 to 3 layers of 0.2 mm thick 6.5% Si steel sheet.

(1) in FIG. 9 shows the results of measurements when ferromagnetic materials, metal materials and similar were not placed in the vicinity of the shield portion 201; (2) shows results measured when an aluminum plate was placed below the shield portion 201, removed by a prescribed distance; (3) shows the results measured when an aluminum plate of area broader than the shield portion 201 was placed directly below the shield portion 201. In the examples (2) and (3), as indicated in FIG. 2B, the existence of peripheral circuitry 26 is modeled, to ascertain the changes in inductance.

As shown in FIG. 9, regardless of the thickness of the 6.5% Si steel sheet used in the shield layer 231, as the number of layers in the shield layer 231 increased, the inductance increased. Hence if the shield layer 231 is formed from a plurality of sheets, for example, the reception intensity of the tablet 20 can be greatly improved.

This result is similar even when an aluminum plate is positioned below the shield portion 201 (2) and when an aluminum plate is positioned directly below the shield portion 201 (3). Although the inductance as a whole declines due to the effect of the aluminum plate, as the number of layers in the shield layer 231 is increased, the inductance increases and the reception intensity of the tablet 20 is improved.

Thus in the coordinate input device 1, wireless signals are transmitted and received with the input pen 10 based on electromagnetic coupling between the input pen 10 and the tablet 20, so that the position indicated by the input pen 10 and operations using the input pen 10 are detected. In such a tablet 20, a shield portion 201 is provided on the rear-surface side of the sensor substrate 24, on which are placed loop coil groups 28, 29, and in the shield portion 201 are provided a shield plate 221, and a shield layer 231 which overlaps with the rear-side surface of the shield plate 221, so that magnetic flux lines are increased at the ends and four corners of the loop coil groups 28 and 29, and the reception intensity at the ends and four corners of the tablet 20 can be improved. Also, because in the tablet 20 diversion of magnetic flux lines occurs from the sensor substrate 24 around both the shield plate 221 and shield layer 231, the reception intensity at the ends and four corners of the tablet 20 is increased. Hence signals from the input pen can be precisely and reliably received in the end portions of the operation surface 20a, and even if the sensor substrate 24 is made smaller and the peripheral circuitry layout is more dense in order to reduce the size of the coordinate input device 1, the precision of position detection can be improved and ease of use can be enhanced.

As the material used in the shield layer 231 provided on the rear-surface side of the shield plate 221, a ferromagnetic material other than iron is preferable. For example, a material with an inductance of 75 µH or higher, and with for example a relative permeability of 7000 or higher, may be called suitable. Further, any one among, for example, Si steel plate (1-4 wt %), NiCr alloy plate, 6.5% Si steel plate, PB permalloy, 42-Ni alloy plate, amorphous magnetic alloy plate (before heat treatment), PC permalloy, and amorphous magnetic alloy plate (after heat treatment), is still more preferable. Moreover, the shield layer 231 may be only a single layer of one of the above materials, but if formed as a plurality of layers, the reception intensity of the tablet 20 can be further improved.

Here, by using as the shield plate 221 silicon steel containing 4.0 to 7.0 weight percent silicon, for example, rather than only 6.5% Si steel plate, similar effects can be obtained.

In the above, the frequencies of the various signals, the times of actions performed, and the like are merely examples. For example, the numbers of loop coils in the loop coil groups 28 and 29 are not limited to 48, but may be modified according to the size of the tablet 20, the detection precision required, and the like. Also, although the input pen 10 was described as a pen-type position indicator; but this invention is not limited thereto, and a shape which mimics an airbrush, as well as other shapes, may be used.

In the above, the shield portion 201 is provided with a shield layer 231 on the rear-surface side of the shield plate 221. The invention is not limited to such a configuration, and for example the shield layer 231 may be provided on the front side of the shield plate 221, that is, between the shield plate 221 and the sensor substrate 24. In this case, by bringing the shield layer 231 into even closer proximity to the sensor substrate 24, the effect of the shield layer 231 appears more pronounced. That is, the reception intensity at the edge portions of the sensor substrate 24 can be enhanced even further.

Further, in the above aspect, a shield layer 231 of the same size and shape as the shield plate 221 was employed; but the invention is not limited to this configuration, and the size and shape can be altered.

For example, as shown in FIGS. 10A-D, a configuration may be employed in which the shield layer is provided only at a position equivalent to one end portion of the sensor substrate 24.

Figure 10A:
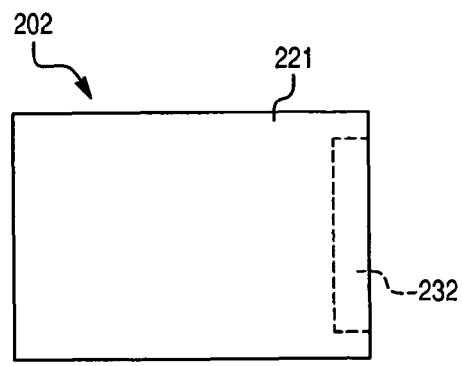
FIG. 10A is a plan view showing the front side.
Figure 10B:
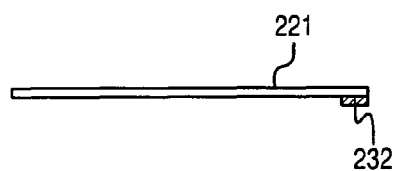
FIG. 10B is a front elevational view.
Figure 10C:
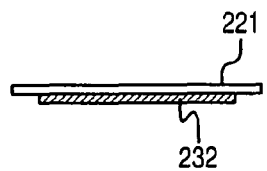
FIG. 10C is a side elevational view.
Figure 10D:
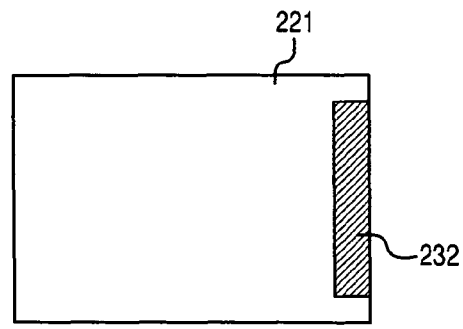
FIG. 10D is a bottom plan view showing the rear side.

FIG. 10A is a plan view showing the front side of shield portion 202 used in place of shield portion 201, FIG. 10B is a front elevational view, FIG. 10C is a side elevational view, and FIG. 10D is a bottom plan view showing the rear side.

The shield portion 202 is provided with a strip-shaped shield layer 232 extending in the direction of the shorter edge of the shield plate 221, on the rear surface of one end portion of the shield plate 221. The material of the shield layer 232 is similar to that of the shield layer 231 in the above aspect, and may comprise a single layer or a plurality of layers.

In this case, the inductance of the shield portion is increased at an end portion, at which the reception sensitivity in the sensor substrate 24 tends to decline, so that the magnetic lines of force due to currents flowing in the loop coils positioned in the end portion of the sensor substrate 24 are increased, and reception intensity can be raised. By this means, the position of the input pen 10 in the end portion of the sensor substrate 24, and operations by the pen, can be detected precisely and reliably. Further, the shield layer 232 need only be a very small size compared with the shield plate 221, and so is expected to contribute to lower costs.

As shown in FIGS. 11A-D, a configuration may be employed in which the shield layer is provided only at the corners on one side of the sensor substrate 24.

Figure 11A:
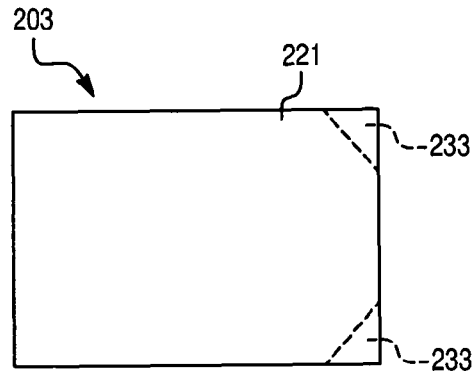
FIG. 11A is a plan view showing the front side.
Figure 11B:
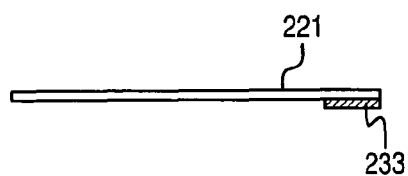
FIG. 11B is a front elevational view.
Figure 11C:
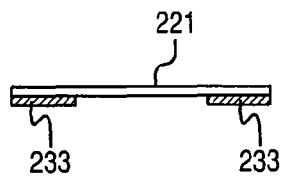
FIG. 11C is a side elevational view.
Figure 11D:
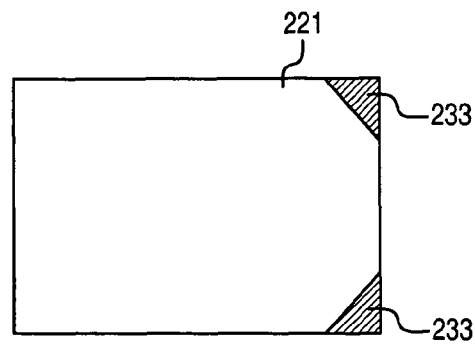
FIG. 11D is a bottom plan view showing the rear side.
Figure 12A:
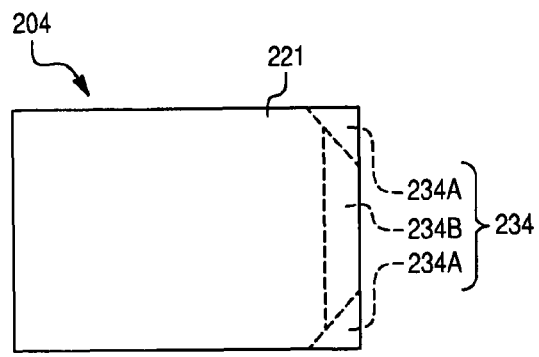
FIG. 12A is a plan view showing the front side.
Figure 12B:
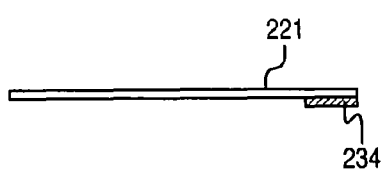
FIG. 12B is a front elevational view.
Figure 12C:
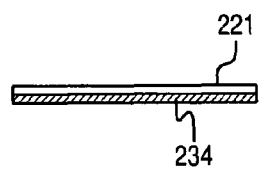
FIG. 12C is a side elevational view.
Figure 12D:
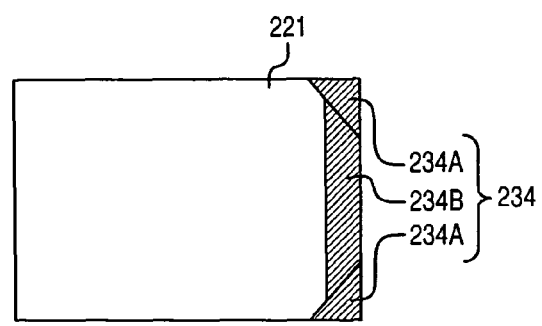
FIG. 12D is a bottom plan view showing the rear side.
Figure 13A:
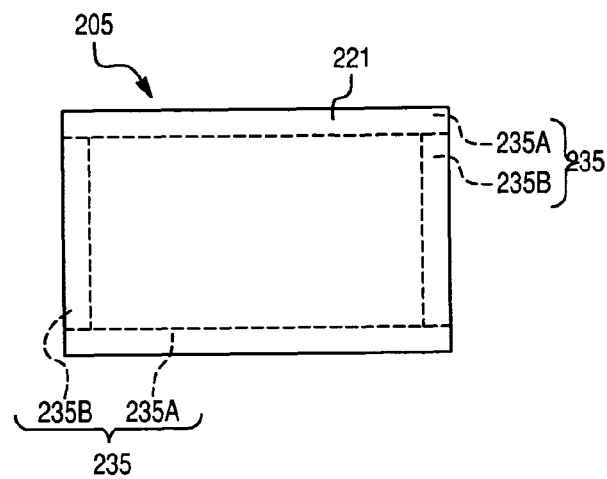
FIG. 13A is a plan view showing the front side.
Figure 13B:
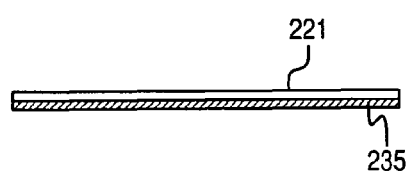
FIG. 13B is a front elevational view.
Figure 13C:
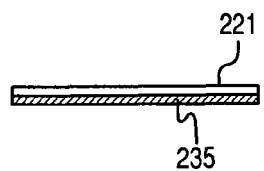
FIG. 13C is a side elevational view.
Figure 13D:
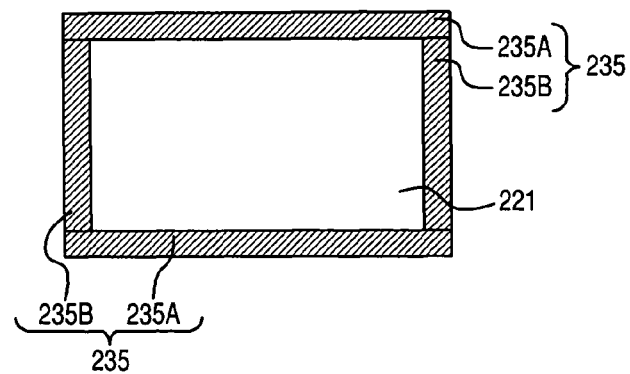
FIG. 13D is a bottom plan view showing the rear side.
Figure 14A:
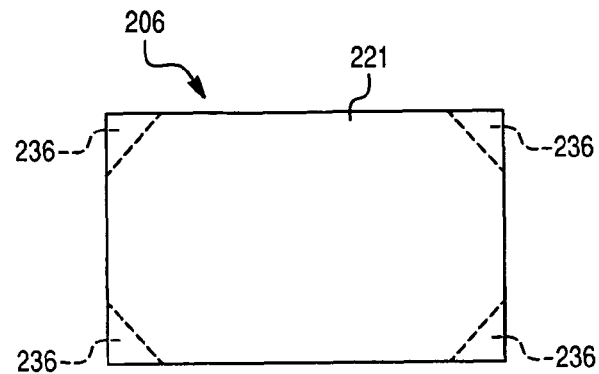
FIG. 14A is a plan view showing the front side.
Figure 14B:
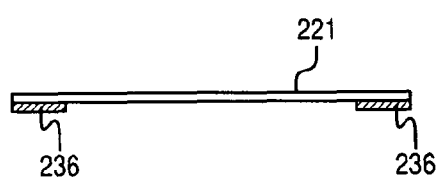
FIG. 14B is a front elevational view.
Figure 14C:
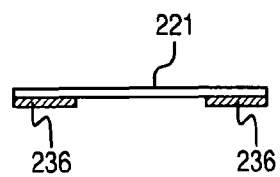
FIG. 14C is a side elevational view.
Figure 14D:
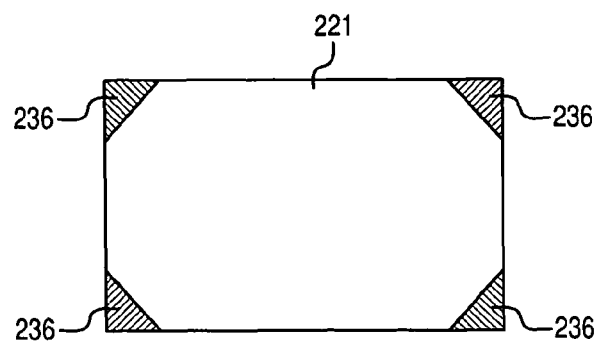
FIG. 14D is a bottom plan view showing the rear side.

FIG. 11A is a plan view showing the front side of shield portion 203, FIG. 11B is a front elevational view, FIG. 11C is a side elevational view, and FIG. 11D is a bottom plan view showing the rear side.

On the rear-surface side of the shield plate 221, the shield portion 203 provides right-triangle shaped shield layers 233 at each of two corners positioned on one side in the long-edge direction of the shield plate 221, among the four corners of the shield plate 221. The materials making up the shield layers 233 are similar to those of the shield layer 231 in the above embodiments, and may comprise one layer or a plurality of layers.

In this case, the inductance of the shield portion is increased in corner portions in which the reception sensitivity of the sensor substrate 24 tends to decline, so that magnetic lines of flux due to the currents flowing in loop coils in corner portions of the sensor substrate 24 are increased, and the reception sensitivity can be raised. Thus the reception intensity of the sensor substrate 24 can be effectively improved, the position of the input pen 10 in the end portion and pen operations can be detected precisely and reliably, and the ease of use of the coordinate input device 1 can be effectively enhanced.

As shown in FIGS. 12A-D, a configuration may also be employed in which shield layers are provided at one end portion and in corners of the sensor substrate 24.

FIGS. 12 A-D show the configuration of a shield portion 204 which replaces the shield portion 201. FIG. 12A is a plane view showing the front side, FIG. 12B is a front elevational view, FIG. 12C is a side elevational view, and FIG. 12D is a bottom plan view showing the rear side.

The shield portion 204 has a configuration in which the shield layer 234 covers the corners and one end along one side in the length direction of the shield plate 221 on the rear-surface side of the shield plate 221. The shield layer 234 is formed from a plurality of members, which are the shield layers 234A and the shield layer 234B. More specifically, the shield layer 234 comprises two shield layers 234A, each positioned at one of the two corners positioned on one end in the length direction of the shield plate 221 among the four corners, and a shield layer 234B which spans the interval between these two shield layers 234A. The shield layers 234A have a right-triangle shape which overlaps with corners of the shield plate 221. The shield layer 234B is formed in a strip shape. The materials from which the shield layers 234A and 234B are formed are similar to those of the shield layer 231 in the above embodiments, and may comprise a single layer or a plurality of layers. Different materials may be used for the shield layers 234A and for the shield layer 234B. Moreover, the shield layers 234A and the shield layer 234B may partially overlap.

In this embodiment, the inductance of the shield portion is increased in one end portion and corner portions of the sensor substrate 24, so that the magnetic flux lines due to current flowing in the loop coils of the end portion and corner portions of the sensor substrate 24 are increased, the reception intensity can be raised, the reception intensity of the sensor substrate 24 can be effectively improved, and the position of and operations by the input pen 10 in the end portion can be precisely and reliably detected, and the ease of use of the coordinate input device 1 can be effectively enhanced.

As shown in FIGS. 13A-D, a configuration may also be used in which shield layers are placed at the edge portions of the sensor substrate 24.

FIGS. 13 A-D show the configuration of a shield portion 205 which replaces the shield portion 201. FIG. 13A is a plane view showing the front side, FIG. 13B is a front elevational view, FIG. 13C is a side elevational view, and FIG. 13D is a bottom plan view showing the rear side.

The shield portion 205 has a configuration in which the shield layer 235, has a frame-like shape, is placed so as to overlap the four edges of the shield plate 221 on the rear-surface side of the shield plate 221. The shield layer 235 comprises a plurality of members, which are the shield layers 235A and the shield layers 235B. More specifically, the shield layer 235 is configured as a rectangular frame which combines two strip-shaped shield layers 235A, extending along the longer-edge direction of the shield plate 221, and two strip-shaped shield layers 235B, extending in the shorter-edge direction of the shield plate 221. The material of the shield layers 235A and 235B are similar to those of the shield layers in the above embodiments, and may comprise a single layer or a plurality of layers. Also, different materials may be used in the shield layers 235A and the shield layers 235B. The shield layers 235A and shield layers 235B may partially overlap.

In this embodiment, the inductance of the shield portion is raised in all the end portions and corner portions of the sensor substrate 24. Magnetic flux lines due to currents flowing in loop coils in the end portions and corner portions of the sensor substrate 24 are increased, reception intensity is raised, the reception intensity of the sensor substrate 24 is effectively improved, and the position of and actions by the input pen 10 in the end portions can be detected precisely and reliably, so that the ease of use of the coordinate input device 1 can be effectively enhanced.

As shown in FIGS. 14A-D, a configuration may also be used in which shield layers are placed in the four corners of the sensor substrate 24.

FIG. 14 show the configuration of a shield portion 206 which replaces the shield portion 201. FIG. 14A is a plan view showing the front side, FIG. 14B is a front elevational view, FIG. 14C is a side elevational view, and FIG. 14D is a bottom plan view showing the rear side.

The shield portion 206 has a configuration in which right-triangle shaped shield layers 236 are placed so as to overlap with each of the four corners of the shield plate 221 on the rear-surface side of the shield plate 221. The material of the shield layers 236 are similar to those of the shield layers in the above embodiments, and may comprise a single layer or a plurality of layers.

In this embodiment, the inductance of the shield portion in all of the corners of the sensor substrate 24 is increased, magnetic flux lines due to currents flowing in loop coils in the four corners of the sensor substrate 24 are increased, reception intensity is raised, the reception intensity of the sensor substrate 24 is effectively improved, and the position of and actions by the input pen 10 in the end portions can be detected precisely and reliably, so that the ease of use of the coordinate input device 1 can be effectively enhanced.

A configuration may be adopted in which, in the example shown in FIG. 14, shield layers are further provided between the shield layers positioned in the four corners of the sensor substrate 24, so that the four edges of the sensor substrate 24 are covered, as shown in FIGS. 15A-D.

Figure 15A:
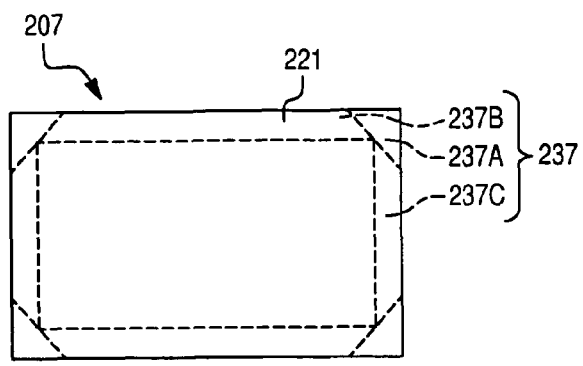
FIG. 15A is a plan view showing the front side.
Figure 15B:
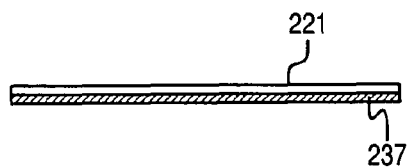
FIG. 15B is a front elevational view.
Figure 15C:
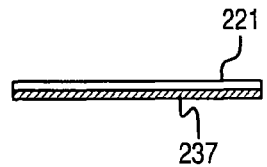
FIG. 15C is a side elevational view.
Figure 15D:
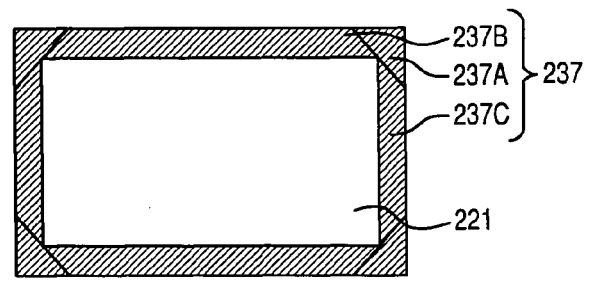
FIG. 15D is a bottom plan view showing the rear side.
Figure 16A:
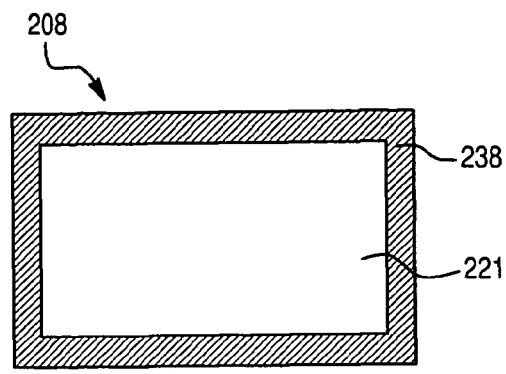
FIG. 16A is a plan view showing the front side.
Figure 16B:
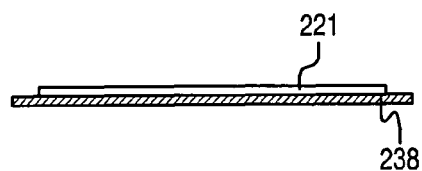
FIG. 16B is a front elevational view.
Figure 16C:
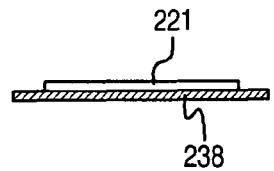
FIG. 16C is a side elevational view.
Figure 16D:
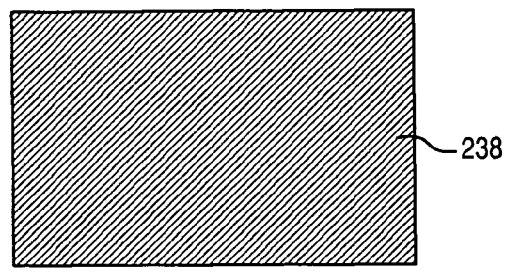
FIG. 16D is a bottom plan view showing the rear side.

FIGS. 15A-D show the configuration of a shield portion 207 which replaces the shield portion 201. FIG. 15A is a plane view showing the front side, FIG. 15B is a front elevational view, FIG. 15C is a side elevational view, and FIG. 15D is a bottom plan view showing the rear side.

In the shield portion 207, the frame-shaped shield layer 237 is placed so as to overlap the four edges of the shield plate 221 on the rear-surface side of the shield plate 221. The shield layer 237 comprises a plurality of members, which are the shield layers 237A, 237B, 237C. More specifically, the shield layer 237 is formed into a rectangular frame by combining four right-triangle shaped shield layers 237A, positioned at the four corners of the shield plate 221; two shield layers 237B span the interval between shield layers 237A along the longer-edge direction of the shield plate 221; and two shield layers 237C span the interval between shield layers 237A along the shorter-edge direction of the shield plate 221. The materials of the shield layers 237A, 237B, 237C are similar to those of the shield layers of the above embodiments, and may comprise one layer or a plurality of layers. Also, different materials may be used in the shield layers 237A, 237B, 237C. The shield layers 237A and the shield layers 237B and 237C may partially overlap.

In this embodiment, the inductance of the shield portion is increased in all of the end portions and corner portions of the sensor substrate 24. Magnetic flux lines due to currents flowing in loop coils in the end portions and corner portions of the sensor substrate 24 are increased, reception intensity can be raised, the reception intensity of the sensor substrate 24 is effectively improved, and the position of and actions by the input pen 10 in the end portions can be detected precisely and reliably, so that the ease of use of the coordinate input device 1 can be effectively enhanced.

Further, a configuration can be employed in which a shield layer which is larger than the shield plate is provided, as in FIGS. 16A-D.

FIGS. 16 A-D show the configuration of a shield portion 208 which replaces the shield portion 201. FIG. 16A is a plane view showing the front side, FIG. 16B is a front elevational view, FIG. 16C is a side elevational view, and FIG. 16D is a bottom plan view showing the rear side.

In the shield portion 208, rectangular shield layer 238 has a size larger than the shield plate 221 and is placed on the rear-surface side of the shield plate 221. The shape of the shield layer 238 is substantially similar to that of the shield plate 221, and similarly to the shield layer 231 of the above embodiment, comprises one layer or a plurality of layers.

In this embodiment, the reception intensity at the ends and four corners of the sensor substrate 24 is increased, and the shield layer 238 protrudes from the ends of the sensor substrate 24, so that the reception intensity is increased at the end portions of the sensor substrate 24 in particular. That is, the end portions of the sensor substrate 24 can be placed into a state of being surrounded by high-inductance material, so that magnetic flux lines due to current flowing in loop coils in the end portions and corner portions of the sensor substrate 24 are increased, and the reception intensity can be raised prominently. As a result, the position of and operations by the input pen 10 can be precisely and reliably detected, and the ease of use of the coordinate input device 1 can be effectively enhanced.

As shown in FIGS. 17A-D, a configuration may be used in which the shield layer is exposed from one portion of the shield plate.

Figure 17A:
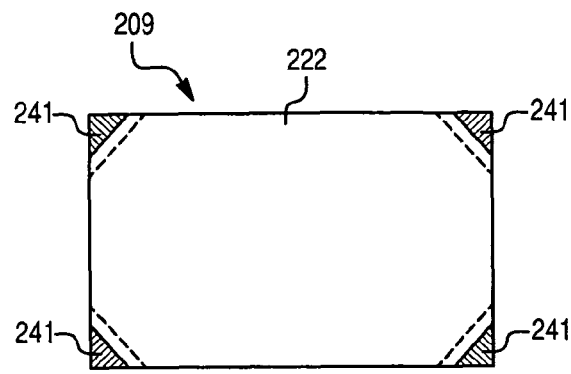
FIG. 17A is a plan view showing the front side.
Figure 17B:
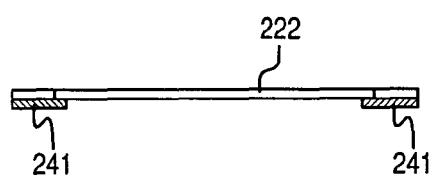
FIG. 17B is a front elevational view.
Figure 17C:
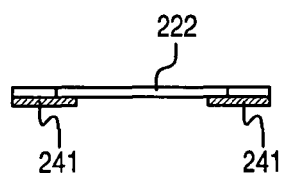
FIG. 17C is a side elevational view.
Figure 17D:
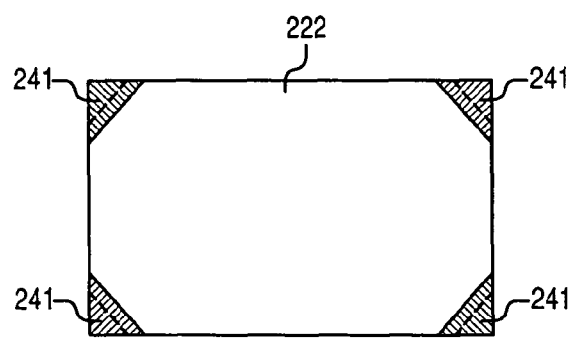
FIG. 17D is a bottom plan view showing the rear side.

FIGS. 17A-D show the configuration of a shield portion 209 which replaces the shield portion 201. FIG. 17A is a plan view showing the front side, FIG. 17B is a front elevational view, FIG. 17C is a side elevational view, and FIG. 17D is a bottom plan view showing the rear side.

The shield portion 209 comprises a shield plate 222 having the shape of a rectangle with triangular areas removed in the four corners. Four shield layers 241 formed into triangular shapes in a size cover the removed portions in the four corners of the shield plate 222. The shield layers 241 are positioned on the rear side in each of the four corners of the shield plate 222. Hence on the front-side surface of the shield portion 209, the shield layers 241 are exposed from the removed portions in the four corners of the shield plate 222. Here, the shield plate 221 is a rectangular shape of size larger than the size of the operation surface 20a (FIG. 1), with the four corners removed, and the operation surface 20a fits on the inside of the removed portions in the four corners.

The shield plate 222 is formed from material similar to that of the shield plate 221. Also, the material of the shield layer 241 is similar to that of the shield layer 231 in the above aspect, and comprises one layer or a plurality of layers. It is desirable that the material and number of layers of the shield layer 241 may be determined such that the inductance of the shield layers 241 is greater than that of the shield plate 222.

By means of this configuration, the inductance in the four corners of the shield portion 209 is larger than in other areas. The magnetic flux lines due to currents flowing in loop coils in the four corners of the sensor substrate 24 are increased, and when the shield portion 209 is positioned on the rear-surface side of the sensor substrate 24, the reception intensity is increased in the four corners of the sensor substrate 24.

Further, as shown in FIGS. 18A-D, an embodiment may be employed in which the shape of the shield plate is different from a rectangular shape, and a shield layer is formed so as to protrude from the four corners and edge portions of the shield plate.

Figure 18A:
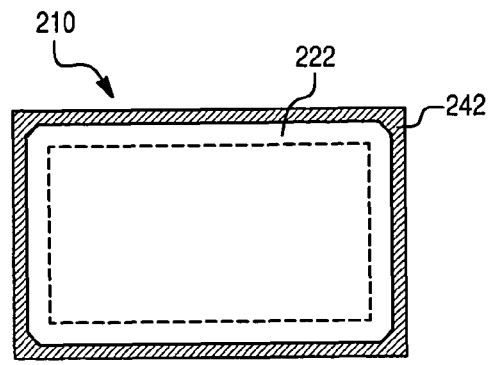
FIG. 18A is a plan view showing the front side.
Figure 18B:
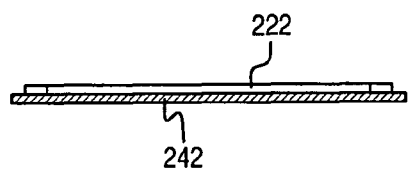
FIG. 18B is a front elevational view.
Figure 18C:
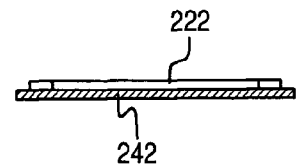
FIG. 18C is a side elevational view.
Figure 18D:
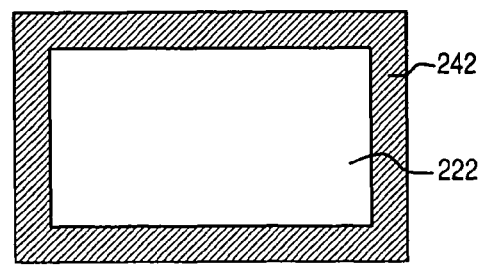
FIG. 18D is a bottom plan view showing the rear side.

FIGS. 18A-D show the configuration of a shield portion 210 which replaces the shield portion 201. FIG. 18A is a plan view showing the front side, FIG. 18B is a front elevational view, FIG. 18C is a side elevational view, and FIG. 18D is a bottom plan view showing the rear side.

The shield portion 210 comprises a shield plate 222 and a shield layer 242, formed into a frame-shape and of size such as to protrude from the edges of the shield plate 222. Hence on the front-side surface of the shield portion 210, the shield layer 242 is exposed in the removed portions in the four corners of the shield plate 222 and at the edge portions of the shield plate 222. Because the shield layer 242 has a frame shape, there is no shield layer 242 in the center portion and periphery thereof of the shield plate 222.

The material of the shield layer 242 is similar to that of the shield layer 231 of the above embodiments, and comprises one layer or a plurality of layers. It is desirable that the material and the number of layers of the shield layer 242 be determined such that the inductance of the shield layer 242 is greater than that of the shield plate 222.

In this case, the shield layer 242 is positioned so as to cover the edge portions of the sensor substrate 24, and also to protrude beyond the ends of the sensor substrate 24, so that the reception intensity at the end portions of the sensor substrate 24 is increased. That is, the end portions of the sensor substrate 24 can be placed into a state of being surrounded by high-inductance material, so that magnetic flux lines due to current flowing in loop coils in the end portions and corner portions of the sensor substrate 24 are increased, and the reception intensity can be raised prominently. As a result, the position of and operations by the input pen 10 can be precisely and reliably detected, and the ease of use of the coordinate input device 1 can be effectively enhanced.

Further, as shown in FIGS. 19A-D, a configuration may be employed in which the shape of the shield plate is different from a rectangular shape, and a portion of the shield layer protrudes on the outside of the shield plate.

Figure 19A:
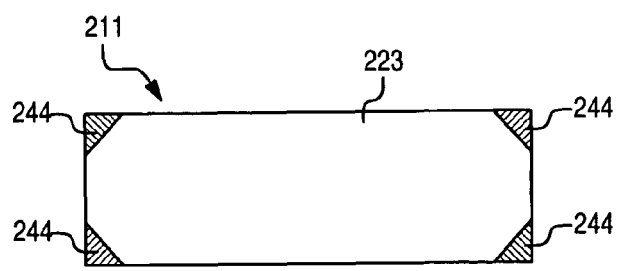
FIG. 19A is a plan view showing the front side.
Figure 19B:
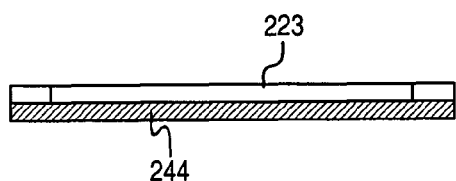
FIG. 19B is a front elevational view.
Figure 19C:
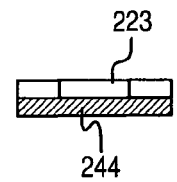
FIG. 19C is a side elevational view.
Figure 19D:
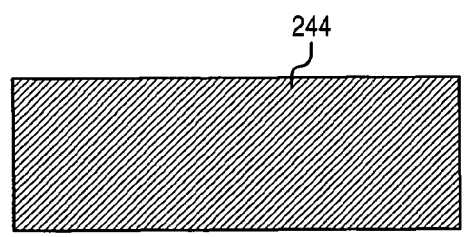
FIG. 19D is a bottom plan view showing the rear side.

FIGS. 19A-D show the configuration of a shield portion 211 which replaces the shield portion 201. FIG. 19A is a plan view showing the front side, FIG. 19B is a front elevational view, FIG. 19C is a side elevational view, and FIG. 19D is a bottom plan view showing the rear side.

The shield portion 211 comprises a shield plate 223 and a shield layer 244, formed into a rectangular shape and of substantially the same size as the shield plate 223. Hence on the surface on the front side of the shield portion 210, the shield layer 244 is exposed in removed portions in the four corners of the shield plate 222.

The material of the shield layer 244 is similar to that of the shield layer 231 of the above embodiment, and comprises one layer or a plurality of layers. It is desirable that the material and the number of layers of the shield layer 244 be determined such that the inductance of the shield layer 244 is greater than that of the shield plate 223.

In this case, magnetic flux lines due to current flowing in loop coils in the four corners of the sensor substrate 24 are increased, and the reception intensity in the four corners of the sensor substrate 24 can be raised prominently. As a result, the position of and operations by the input pen 10 can be precisely and reliably detected, and the ease of use of the coordinate input device 1 can be effectively enhanced.

Further, as shown in FIGS. 20A-D, a configuration may be employed in which the shape of the shield plate is different from a rectangular shape, and a shield layer of size greater than the shield plate is provided.

Figure 20A:
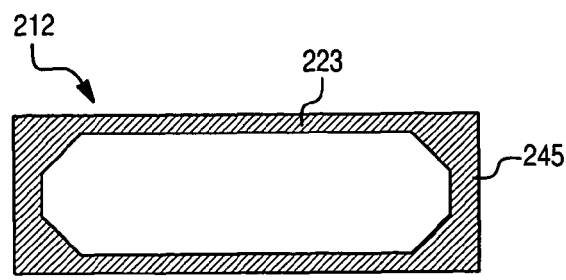
FIG. 20A is a plan view showing the front side.
Figure 20B:
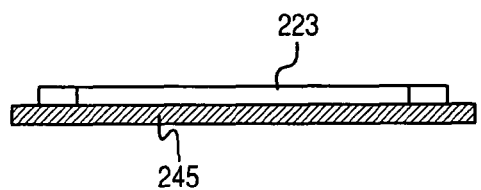
FIG. 20B is a front elevational view.
Figure 20C:
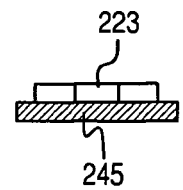
FIG. 20C is a side elevational view.
Figure 20D:
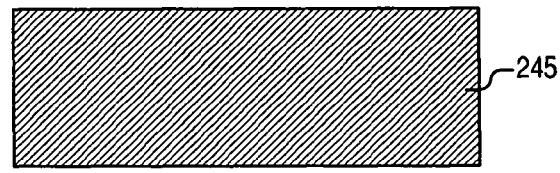
FIG. 20D is a bottom plan view showing the rear side.

FIGS. 20A-D show the configuration of a shield portion 212 which replaces the shield portion 201. FIG. 20A is a plan view showing the front side, FIG. 20B is a front elevational view, FIG. 20C is a side elevational view, and FIG. 20D is a bottom plan view showing the rear side.

The shield portion 212 comprises a shield plate 223 and a shield layer 245, formed into a rectangle of size larger than the shield plate 223. Hence on the surface on the front side of the shield portion 212, the shield layer 245 is exposed from the removed portions in the four corners and the edge portions of the shield plate 223.

The material of the shield layer 245 is similar to that of the shield layer 231 of the above embodiments, and comprises one layer or a plurality of layers. It is desirable that the material and the number of layers of the shield layer 245 be determined such that the inductance of the shield layer 245 is greater than that of the shield plate 223.

In this case, the reception intensity can be increased considerably over the entirety of the sensor substrate 24, and the shield layer 245 is positioned so as to protrude from the ends of the sensor substrate 24, so that the reception intensity is increased at the end portions of the sensor substrate 24 in particular. That is, the end portions of the sensor substrate 24 can be placed into a state of being surrounded by high-inductance material, so that magnetic flux lines due to current flowing in loop coils in the end portions and corner portions of the sensor substrate 24 are increased, and the reception intensity can be raised prominently. As a result, the position of and operations by the input pen 10 can be precisely and reliably detected, and the ease of use of the coordinate input device 1 can be effectively enhanced.

Moreover, a shield layer can be positioned not only on the rear surface of the shield plate 221, but on the front-side surface of the shield plate 221.

Figure 21A:
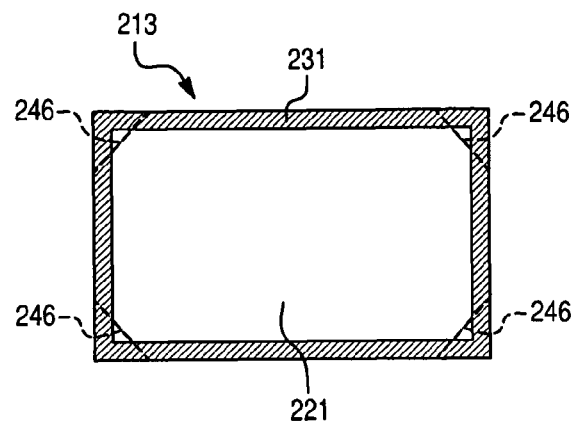
FIG. 21A is a plan view showing the front side.
Figure 21B:
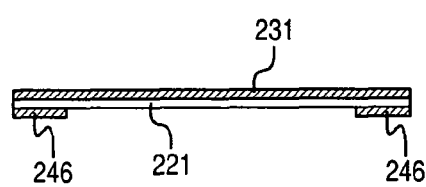
FIG. 21B is a front elevational view.
Figure 21C:
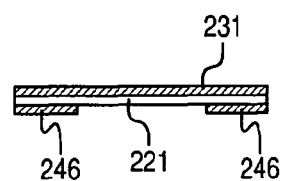
FIG. 21C is a side elevational view.
Figure 21D:
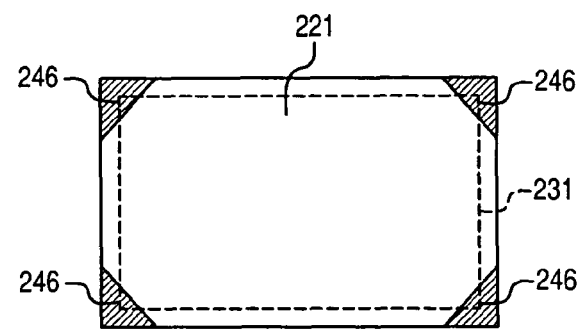
FIG. 21D is a bottom plan view showing the rear side.

FIGS. 21A-D show the configuration of a shield portion 213 which replaces the shield portion 201. FIG. 21A is a plan view showing the front side, FIG. 21B is a front elevational view, FIG. 21C is a side elevational view, and FIG. 21D is a bottom plan view showing the rear side.

The shield portion 213 comprises a shield plate 221. Four right-triangle shape shield layers 246, on the rear-surface side of the shield plate 221, are positioned so as to overlap each of the four corners of the shield plate 221. A shield layer 231 covers the front-side surface of the shield plate 221. The materials of the shield layer 246 are similar to those of the shield layer 231 in the above embodiments, and may comprise one layer or a plurality of layers.

In this embodiment, the reception sensitivity can be greatly increased over the entirety of the sensor substrate 24. Moreover, there are two shield layers provided in the four corners of the sensor substrate 24, so that magnetic flux lines due to current flowing in loop coils in the corner portions of the sensor substrate 24 are increased, and the reception intensity can be raised prominently. As a result, the position of and operations by the input pen 10 can be precisely and reliably detected, and the ease of use of the coordinate input device 1 can be effectively enhanced.

In the above embodiments, configurations have been described in which reception intensity is increased by placing a material with high inductance or high relative permeability in the shield portion, positioned on the rear-surface side of the sensor substrate 24. The performance of the coordinate input device 1 can also be improved by lowering the reception intensity in a portion of the sensor substrate 24.

Figure 22A:
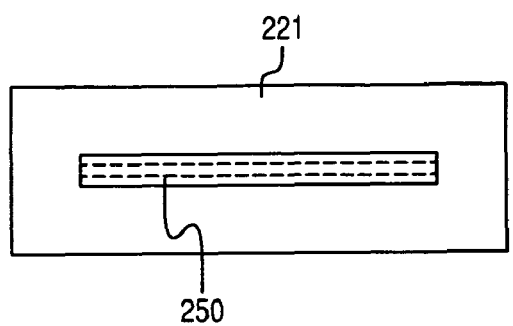
FIG. 22A is a plan view showing the front side.
Figure 22B:
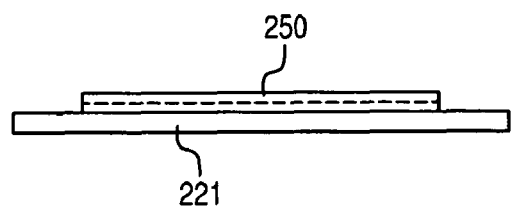
FIG. 22B is a front elevational view.
Figure 22C:
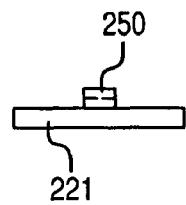
FIG. 22C is a side elevational view.

That is, as indicated in FIG. 22A through FIG. 22C, a configuration may be employed in which a metal layer 250 is positioned in a position covering the center and vicinity thereof of the shield plate 221, in the front-side surface of the shield plate 221.

In this case, due to the effect of the metal layer 250 in the center portion of the shield plate 221, the inductance is lowered, and the reception intensity is reduced.

Figure 23A:
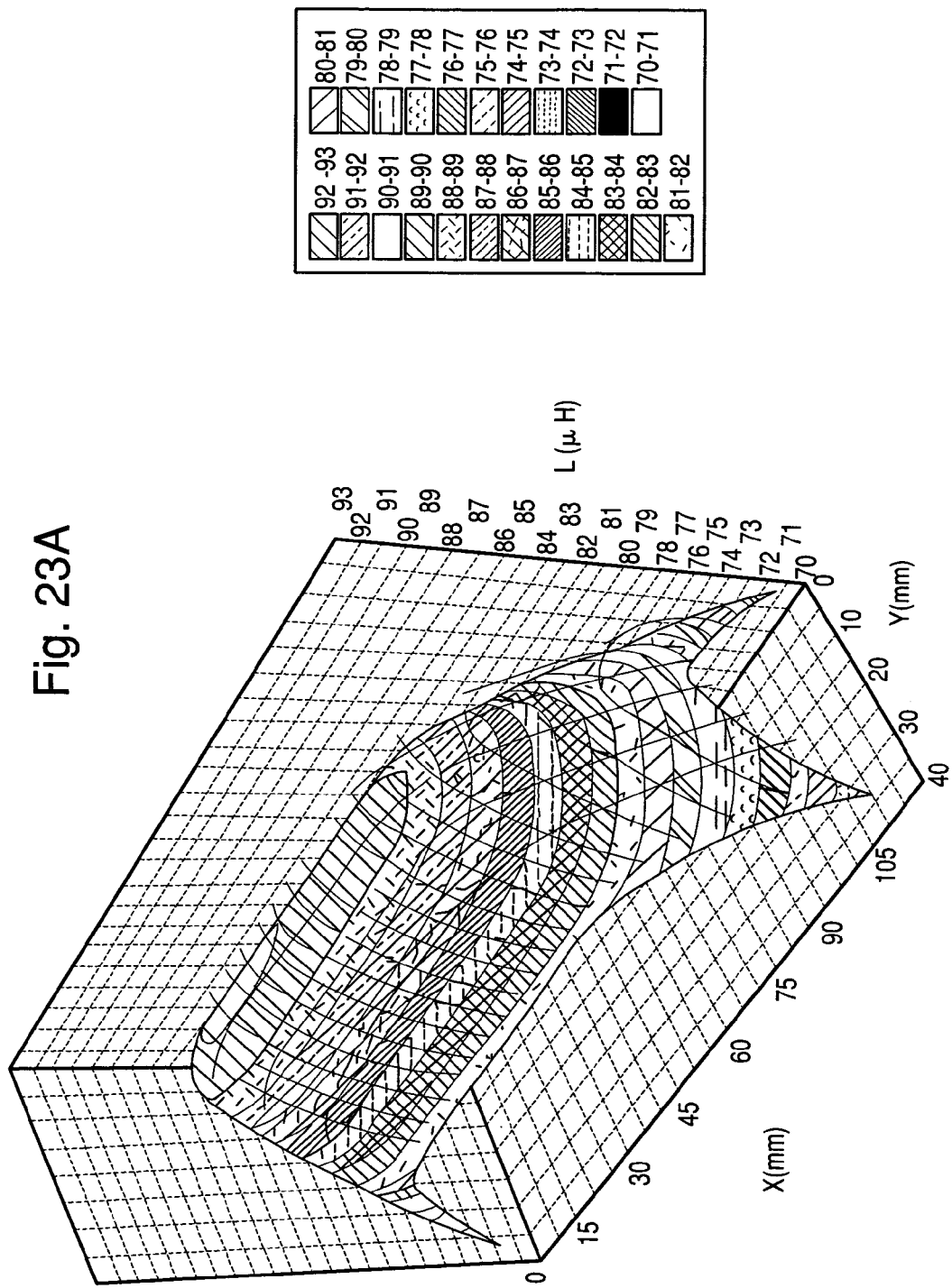
FIG. 23A is a graph illustrating measurement results for a case in which no metal layer is provided.

FIGS. 23A-B show graphs of the inductance for the configuration of FIG. 22. FIG. 22A shows the inductance for the shield plate 221 only, while FIG. 22B shows the inductance with the metal layer 250 positioned.

As indicated in FIGS. 23A and B, when a high-inductance shield plate (amorphous magnetic alloy ribbon) 221 alone is positioned on the rear surface of the sensor substrate 24, the reduction in inductance at the peripheral edges, and in particular in the corner portions, compared with that in the center portion is pronounced. Hence it is expected that in the coordinate input device 1, the difference in reception sensitivity within the operation surface 20a will be extremely large.

In this case, the difference in reception intensities of signals transmitted from the input pen 10 must be corrected through software. The load associated with processing to perform intensity correction of signals received according to the position of the detected input pen 10 is substantial, and this method is not desirable.

When the metal layer 250 is positioned in the center of the shield plate 221, as shown in FIG. 23B, the inductance in the center portion declines, and so the difference in inductance over the entirety of the shield plate 221 becomes small. That is, the difference in characteristics over the entire shield plate 221 is reduced, and there is greater uniformity.

Here, the metal layer 250 is formed of a metal, which is a material causing a decline in the inductance of the shield layer 221; for example, aluminum or another nonmagnetic material, or iron, nickel, cobalt, silicon steel plate, or another ferromagnetic material having a low relative permeability (inductance L), may be used.

In this case, there may arise the need to compensate evenly to the extent that there is a decline in the signal reception intensity. There is no need for compensation of the decline in reception intensity separately according to the position, so the processing load is greatly reduced. Hence the ease of use of the coordinate input device 1 can be enhanced.

The above-described embodiments and modified examples are examples illustrating aspects of the invention, but of course various modifications and applications are possible within the scope of the invention. For example, in the above aspects the shape of the operation surface 20a is rectangular, and the shield portion shape is also rectangular in keeping with the former; but the shape used is arbitrary.

Further, in the above aspects, the materials used to form the shield plate and shield layer of the shield portion were primarily metal materials. This invention is not limited to such materials, and various materials other than metal materials, such as resin materials or similar, may be used, so long as the material matches conditions taking the above-described inductance, maximum relative permeability, or initial relative permeability as an index.

As the sizes of the shield plates in the above aspects and modified examples, for example, a length of 40 mm and width of 110 mm, or length of 200 mm and width of 300 mm may be used, but these are merely examples, and values can be varied arbitrarily according to the size and other parameters of the electronic equipment to which the shield portion is applied. Similarly, other details of the configuration can also be modified arbitrarily.

It should be understood by those skilled in the art that various modifications, combinations, sub-combinations and alternations may occur depending on design requirements and other factors insofar as they are within the scope of the appended claims or the equivalents thereof.

What is claimed is:

1. A position detection device configured to detect a position indicated by a position indicator through electromagnetic inductive action with the position indicator, the position detection device comprising:
    a sensor portion comprising a first plurality of coils and a second plurality of coils, the coils of the first plurality overlapping and arranged orthogonally to the coils of the second plurality;
    a shield plate below the plurality of coils of the sensor portion, the shield plate having a surface; and
    a magnetic body comprising a ferromagnetic material other than pure iron positioned to overlap at least a portion of the surface of the shield plate,
    wherein the magnetic body is a ferromagnetic material and has an inductance, maximum relative permeability, or initial relative permeability equal to or greater than that of the material of the shield plate.

2. The position detection device according to claim 1, wherein the magnetic body is formed by layering a plurality of layers of the ferromagnetic material.

3. The position detection device according to claim 1, wherein the ferromagnetic material has an inductance of at least 75 µH.

4. The position detection device according to claim 1, wherein the ferromagnetic material has a maximum relative permeability of at least 7000.

5. The position detection device according to claim 1, wherein the ferromagnetic material has an initial relative permeability of at least 1500.

6. The position detection device according to claim 1, wherein the ferromagnetic material is selected from the group consisting of silicon steel, NiCr alloy, PB permalloy, 42-Ni alloy, an amorphous magnetic alloy which has not been heat-treated, PC permalloy, and heat-treated amorphous magnetic alloy.

7. The position detection device according to claim 1, wherein the shield plate is formed from silicon steel.

8. The position detection device according to claim 7, wherein the silicon steel contains 4.0 to 7.0 weight percent silicon.

9. The position detection device according to claim 8, wherein the magnetic body does not overlap an entire face of the shield plate, so that, when the shield plate is seen from above, a portion of the magnetic body is exposed.

10. The position detection device according to claim 1, wherein the magnetic body covers at least end portions of the shield plate.

11. The position detection device according to claim 1, wherein the magnetic body covers at least one corner portion of the shield plate.

12. The position detection device according to claim 1, wherein the magnetic body covers edge portions of the shield plate.

13. The position detection device according to claim 1, wherein the magnetic body covers one entire face of the shield plate.

14. The position detection device according to claim 1, wherein the magnetic body comprises a plurality of members, each formed from ferromagnetic material.

15. The position detection device according to claim 1, wherein the first and second plurality of coils collectively form an XY orthogonal coordinate system configured to detect a position indicated by a position indicator on the XY orthogonal coordinate system through electromagnetic inductive action between the coils and the position indicator.

16. A position detection device configured to detect a position indicated by a position indicator through electromagnetic inductive action with the position indicator, the position detection device comprising:
    a shield plate below a plurality of coils of a sensor portion, the shield plate having a surface; and
    a magnetic body comprising a ferromagnetic material other than pure iron positioned to overlap at least a portion of the surface of the shield plate, wherein the magnetic body is a ferromagnetic material and has an inductance, maximum relative permeability, or initial relative permeability equal to or greater than that of the material of the shield plate.

17. A position detection device configured to detect a position indicated by a position indicator through electromagnetic inductive action with the position indicator, the position detection device comprising:

a shield plate below a plurality of coils of a sensor portion, the shield plate having a surface; and a magnetic body comprising a ferromagnetic material other than pure iron positioned to overlap at least a portion of the surface of the shield plate, wherein the ferromagnetic material has an inductance of at least 75 μH.

18. A position detection device configured to detect a position indicated by a position indicator through electromagnetic inductive action with the position indicator, the position detection device comprising:

a shield plate below a plurality of coils of a sensor portion, the shield plate having a surface; and a magnetic body comprising a ferromagnetic material other than pure iron positioned to overlap at least a portion of the surface of the shield plate, wherein the ferromagnetic material has a maximum relative permeability of at least 7000.

19. A position detection device configured to detect a position indicated by a position indicator through electromagnetic inductive action with the position indicator, the position detection device comprising:

a shield plate below a plurality of coils of a sensor portion, the shield plate having a surface; and a magnetic body comprising a ferromagnetic material other than pure iron positioned to overlap at least a portion of the surface of the shield plate, wherein the ferromagnetic material has an initial relative permeability of at least 1500.

* * * * *